United States Patent
Aminaka

[19]

[11] Patent Number: 6,064,457
[45] Date of Patent: May 16, 2000

[54] LIQUID CRYSTAL DISPLAY WITH ELLIPSOIDAL POLARIZING PLATE HAVING AN OPTICALLY ANISOTROPIC LAYER TRANSPARENT SUBSTRATE AND A POLARIZING MEMBRANE

[75] Inventor: Eiichiro Aminaka, Kanagawa, Japan

[73] Assignee: Fuji Photo Film Co., Ltd., Minami-Ashigara, Japan

[21] Appl. No.: 09/220,365

[22] Filed: Dec. 24, 1998

[30]  Foreign Application Priority Data

Dec. 25, 1997  [JP]  Japan ................................. 9-358248
Mar. 5, 1998  [JP]  Japan ............................... 10-053974

[51] Int. Cl.[7] ..................... G02F 1/1335; C09K 19/00
[52] U.S. Cl. ...................... 349/117; 349/118; 349/119; 349/120; 428/1
[58] Field of Search ................... 349/117, 118, 349/120, 119; 428/1

[56]  References Cited

U.S. PATENT DOCUMENTS

| | | | |
|---|---|---|---|
| 5,089,906 | 2/1992 | Ohnishi et al. | 359/73 |
| 5,518,783 | 5/1996 | Kawata et al. | 428/1 |
| 5,568,290 | 10/1996 | Nakamura | 359/63 |
| 5,583,679 | 12/1996 | Ito et al. | 349/118 |
| 5,646,703 | 7/1997 | Kamada et al. | 349/118 |
| 5,667,854 | 9/1997 | Yamada | 428/1 |
| 5,736,067 | 4/1998 | Kawata et al. | 252/299.5 |
| 5,747,121 | 5/1998 | Okazaki et al. | 428/1 |
| 5,793,455 | 8/1998 | Nakamura | 349/117 |
| 5,805,253 | 9/1998 | Mori et al. | 349/118 |
| 5,825,445 | 10/1998 | Okamoto et al. | 349/118 |
| 5,883,685 | 3/1999 | Mazaki et al. | 349/117 |

FOREIGN PATENT DOCUMENTS

| | | |
|---|---|---|
| 7-318727 | 12/1995 | Japan . |
| 8-5837 | 1/1996 | Japan . |
| 8-50206 | 2/1996 | Japan . |

*Primary Examiner*—William L. Sikes
*Assistant Examiner*—Tarifur R. Chawdhury
*Attorney, Agent, or Firm*—Burns, Doane, Swecker & Mathis, LLP

[57]  ABSTRACT

A liquid crystal display comprises a liquid crystal cell of a bend alignment mode or a homogeneous alignment mode and two polarizing elements. Each of the elements is arranged on each side of the liquid crystal cell. At least one of the polarizing elements is an ellipsoidal polarizing plate. The ellipsoidal polarizing plate comprises a lamination of an optically anisotropic layer, a transparent substrate and a polarizing membrane. The optically anisotropic layer contains discotic compounds. The transparent substrate is optically anisotropic. The polarizing membrane is arranged as an outermost layer of the liquid crystal display. The optically anisotropic layer and the transparent substrate are so arranged that an angle between a normal discotic direction and a slow axis in plane of the transparent substrate is essentially 45°. The normal discotic direction is an average of directions obtained by projecting normal lines of discotic planes of the discotic compounds on plane of the substrate. The transparent substrate and the polarizing membrane are so arranged that a slow axis in plane of the transparent substrate is essentially parallel to or essentially perpendicular to a transmission axis in plane of the polarizing membrane.

23 Claims, 9 Drawing Sheets

LIQUID CRYSTAL DISPLAY WITH ELLIPSOIDAL POLARIZING PLATE HAVING AN OPTICALLY ANISOTROPIC LAYER TRANSPARENT SUBSTRATE AND A POLARIZING MEMBRANE

FIELD OF THE INVENTION

The present invention relates to a liquid crystal display of a bend alignment mode or a homogeneous alignment mode. The invention also relates to an ellipsoidal polarizing plate used in the liquid crystal display.

BACKGROUND OF THE INVENTION

A liquid crystal display (LCD) has advantages of thin shape, light weight and low consumption of electric power, compared with a cathode ray tube (CRT). The liquid crystal display comprises a liquid crystal cell and two polarizing elements arranged on both sides of the liquid crystal cell. The liquid crystal cell comprises a pair of substrates, rod-like liquid crystal compounds and an electrode layer. The rod-like liquid crystal compounds are provided between the substrates. The electrode layer has a function of applying a voltage to the rod-like liquid crystal compound. Each of the substrates has an orientation layer, which has a function of aligning the rod-like liquid crystal compound.

An optically compensatory sheet (a phase retarder) is usually provided between the liquid crystal cell and the polarizing elements to remove color from an image displayed on the liquid crystal cell. A lamination of the optically compensatory sheet and the polarizing element (polarizing membrane) functions as an ellipsoidal polarizing plate. A stretched birefringent film has usually been used as the optical compensatory sheet.

It has been proposed to use an optical compensatory sheet comprising an optically anisotropic layer containing discotic compounds on a transparent substrate in place of the stretched birefringent film. The optically anisotropic layer is formed by fixing aligned discotic compounds. The discotic compound usually has a large birefringence. Accordingly, an optical compensatory sheet obtained by using the discotic compound has a specific optical characteristic that cannot be obtained by the conventional stretched birefringent film. The optical compensatory sheet using the discotic compound is described in Japanese Patent Provisional Publication No. 6(1994)-214116, U.S. Pat. Nos. 5,583,679, 5,646,703 and German Patent Publication No. 3,911,620A1.

U.S. Pat. Nos. 4,583,825 and 5,410,422 disclose a liquid crystal display of a bend alignment mode having a liquid crystal cell in which rod-like liquid crystal compounds are aligned symmetrically. The alignment of an upper liquid crystal compound is essentially antiparallel to the alignment of a lower liquid crystal compound. The liquid crystal cell of the bend alignment mode has a self-optically compensatory function because of the symmetrical alignment. Therefore, the bend alignment mode is also referred to as an optically compensatory bend (OCB) mode. The liquid crystal display of the bend alignment mode has an advantage of a rapid response.

A liquid crystal cell of a homogeneous alignment mode has also been proposed. In the liquid crystal cell of the homogeneous alignment mode, rod-like liquid crystal compounds are essentially horizontally aligned while not applying voltage to the cell, and are essentially vertically aligned while applying voltage to the cell. The liquid crystal cell of the homogeneous alignment mode has recently been used in a liquid crystal display of an electrically controlled birefringence (ECB) type. The liquid crystal display of the ECB type is described in Japanese Patent Provisional Publication No. 5(1993)-203946.

The bend alignment mode and the homogeneous alignment mode are characterized in a wide viewing angle and a quick response compared with conventional liquid crystal modes (TN mode, STN mode). However, a further improvement is still necessary to be comparable with CRT.

It might be considered that an optical compensatory sheet is used to improve the liquid crystal display of the bend alignment mode or the homogeneous alignment mode in the same manner as in the conventional liquid crystal displays. However, the known optical compensatory sheet of a stretched birefringent film used in a conventional liquid crystal display is not effective in the liquid crystal display of the bend alignment mode or the homogeneous alignment mode. Particularly, the known stretched birefringent film shows a poor optical compensatory effect on the display of the bend alignment mode or the homogeneous alignment mode.

As is described above, an optical compensatory sheet comprising an optically anisotropic layer containing discotic compounds on a transparent substrate has been proposed in place of the stretched birefringent film. Japanese Patent Provisional Publication No. 9(1997)-197397 (U.S. Pat. No. 5,805,253) and International Publication No. WO96/37804 (European Patent Publication No. 0783128A) disclose a liquid crystal display of a bend alignment mode, which has an optical compensatory sheet containing discotic compounds. The liquid crystal display of the bend alignment mode has been remarkably improved in the viewing angle by using the optical compensatory sheet containing discotic compounds.

SUMMERY OF THE INVENTION

The present inventor has studied a liquid crystal display of a bend alignment mode or a homogeneous alignment mode using an optical compensatory sheet containing discotic compounds. As a result, the present inventor has found a problem that a displayed image is colored with leaked light of a specific wavelength. The present inventor has further found that the problem is caused by a wave-length dependency of a transmittance of an ellipsoidal polarizing plate (a lamination of an optically compensatory sheet and a polarizing element). The present inventor has furthermore found that the wavelength dependency of the transmittance is caused by a problem on an arrangement of an optically anisotropic layer, a transparent substrate and a polarizing membrane in the known liquid crystal display.

The prior art references (Japanese Patent Provisional Publication No. 9(1997)-197397 and International Publication No. WO96/37804) does not clearly describe the arrangement of an optically anisotropic layer, a transparent substrate and a polarizing membrane (particularly the direction of the slow axis of the transparent substrate). However, the present inventor considers that an optically anisotropic layer and a transparent substrate have been so arranged that a normal discotic direction (an average of directions obtained by projecting normal lines of discotic planes of discotic compounds on plane of the transparent substrate) is essentially parallel to a slow axis in plane of the transparent substrate, since the above-mentioned arrangement can easily be constructed. The present inventor also considers that a transparent substrate and a polarizing membrane are so arranged that an angle between a slow axis in plane of the transparent substrate and a transmission axis in plane of the polarizing membrane is essentially 45°.

In preparation of an ellipsoidal polarizing plate, a rubbing treatment of discotic compounds has usually been conducted along a longitudinal direction of a rolled transparent substrate because the treatment is easily conducted. The longitudinal direction of a rolled transparent substrate usually is a stretched direction, which corresponds to a slow axis of the transparent substrate. The rubbing direction corresponds to a normal discotic direction, which is an average of directions obtained by projecting normal lines of discotic planes of discotic compounds on plane of the substrate. Further, the optically anisotropic layer and the polarizing membrane should be so arranged that an angle between the normal discotic direction and the transmission axis in plane of the polarizing membrane is essentially 45° to obtain the maximum optically compensatory effect on a liquid crystal cell of a bend alignment mode or a homogeneous alignment mode.

In the case that a transparent substrate is placed between two polarizing membranes which are so arranged that the transmission axes of the membranes are perpendicular to each other, the transmittance (T) is defined by the following formula (3).

$$T=\sin^2(2\phi)\sin^2(\pi Re/\lambda) \qquad (3)$$

in which $\phi$ is an angle between a slow axis in plane of the transparent substrate and a transmission axis in plane of the polarizing membrane (of the light incident side); $\lambda$ is a wavelength of light; and Re is a retardation value in plane of the transparent substrate measured at the wave-length of $\lambda$.

According to prior art, the angle between a slow axis in plane of the transparent substrate and a transmission axis in plane of the polarizing membrane ($\phi$) was 45°. Accordingly, the $\sin^2(2\phi)$ was the maximum value (1). Therefore, a wavelength dependency was caused in the transmittance (T) because of the wavelength dependency of the retardation value in plane of the transparent substrate (Re).

An object of the present invention is to further improve a liquid crystal display of a bend alignment mode or a homogeneous alignment mode without causing color contamination on a displayed image.

Another object of the invention is to provide an ellipsoidal polarizing plate suitable for a liquid crystal display of a bend alignment mode or a homogeneous alignment mode.

The present invention provides a liquid crystal display comprising a liquid crystal cell of a bend alignment mode and two polarizing elements, each of which is arranged on each side of the liquid crystal cell, at least one of said polarizing elements being an ellipsoidal polarizing plate comprising a lamination of an optically anisotropic layer, a transparent substrate and a polarizing membrane, said optically anisotropic layer containing discotic compounds, said transparent substrate being optically anisotropic, and said polarizing membrane being arranged as an outermost layer of the liquid crystal display, wherein the optically anisotropic layer and the transparent substrate are so arranged that an angle between a normal discotic direction and a slow axis in plane of the transparent substrate is essentially 45°, said normal discotic direction being an average of directions obtained by projecting normal lines of discotic planes of the discotic compounds on plane of the substrate, and wherein the transparent substrate and the polarizing membrane are so arranged that a slow axis in plane of the transparent substrate is essentially parallel to or essentially perpendicular to a transmission axis in plane of the polarizing membrane.

The invention also provides a liquid crystal display comprising a liquid crystal cell of a homogeneous alignment mode and two polarizing elements, each of which is arranged on each side of the liquid crystal cell, at least one of said polarizing elements being an ellipsoidal polarizing plate comprising a lamination of an optically anisotropic layer, a transparent substrate and a polarizing membrane, said optically anisotropic layer containing discotic compounds, said transparent substrate being optically anisotropic, and said polarizing membrane being arranged as an outermost layer of the liquid crystal display, wherein the optically anisotropic layer and the transparent substrate are so arranged that an angle between a normal discotic direction and a slow axis in plane of the transparent substrate is essentially 45°, said normal discotic direction being an average of directions obtained by projecting normal lines of discotic planes of the discotic compounds on plane of the substrate, and wherein the transparent substrate and the polarizing membrane are so arranged that a slow axis in plane of the transparent substrate is essentially parallel to or essentially perpendicular to a transmission axis in plane of the polarizing membrane.

The invention further provides an ellipsoidal polarizing plate comprising a lamination of an optically anisotropic layer, a transparent substrate and a polarizing membrane, said optically anisotropic layer containing discotic compounds, said transparent substrate being optically anisotropic, and said polarizing membrane being arranged as an outermost layer, wherein the optically anisotropic layer and the transparent substrate are so arranged that an angle between a normal discotic direction and a slow axis in plane of the transparent substrate is essentially 45°, said normal discotic direction being an average of directions obtained by projecting normal lines of discotic planes of the discotic compounds on plane of the substrate, and wherein the transparent substrate and the polarizing membrane are so arranged that a slow axis in plane of the transparent substrate is essentially parallel to or essentially perpendicular to a transmission axis in plane of the polarizing membrane.

In the present specification, the term "essentially 45°," the term "essentially parallel," the term "essentially perpendicular" or the like means that a margin for error based on the exactly angle is in the range of ±5°. The margin for error is preferably in the range of ±4°, more preferably in the range of ±3°, and most preferably in the range of ±2°.

In the specification, the term "slow axis," the term "fast axis," and the term "transmission axis" mean the direction showing the maximum refractive index, the direction showing the minimum refractive index and the direction showing the maximum transmittance respectively.

The present inventor has succeeded in improving a viewing angle of a liquid crystal display of a bend alignment mode or a homogeneous alignment mode without causing color contamination on a displayed image. The liquid crystal display is improved by changing the arrangement of the an optically anisotropic layer, a transparent substrate and a polarizing membrane.

The formula (3) is cited again.

$$T=\sin^2(2\phi)\sin^2(\pi Re/\lambda) \qquad (3)$$

in which $\phi$ is an angle between a slow axis in plane of the transparent substrate and a transmission axis in plane of the polarizing membrane (of the light incident side); $\lambda$ is a wavelength of light; and Re is a retardation value in plane of the transparent substrate measured at the wave-length of $\lambda$.

According to the present invention, the angle between a slow axis in plane of the transparent substrate and a transmission axis in plane of the polarizing membrane ($\phi$) is adjusted to 0° or 90°. Accordingly, the $\sin^2 (2\phi)$ is the minimum value (0). Therefore, the wavelength dependency of the retardation value in plane of the transparent substrate (Re) does not affect on the transmittance (T).

On the other hand, the optically anisotropic layer and the polarizing membrane are so arranged that an angle between the normal discotic direction and the transmission axis in plane of the polarizing membrane is essentially 45° in the same manner as in prior art. Therefore, the maximum optically compensatory effect on a liquid crystal cell of a bend alignment mode or a homogeneous alignment mode can be obtained by the present invention in the same manner as in prior art.

For the reasons mentioned above, the liquid crystal display of a bend alignment mode or a homogeneous alignment mode is further improved in the viewing angle without causing color contamination on a displayed image.

In preparation of an ellipsoidal polarizing plate, the prior art is advantageous to the present invention.

However, the advantage is not serious. The rubbing treatment of discotic compounds is conducted along a direction of 45° to the longitudinal direction of a rolled transparent substrate according to the present invention, while the rubbing treatment has been conducted along the longitudinal direction according to the prior art. Therefore, the liquid crystal display and the ellipsoidal polarizing plate of the present invention can be prepared by slightly modifying a conventional manufacturing apparatus.

DETAILED DESCRIPTION OF THE INVENTION

Figure 1:
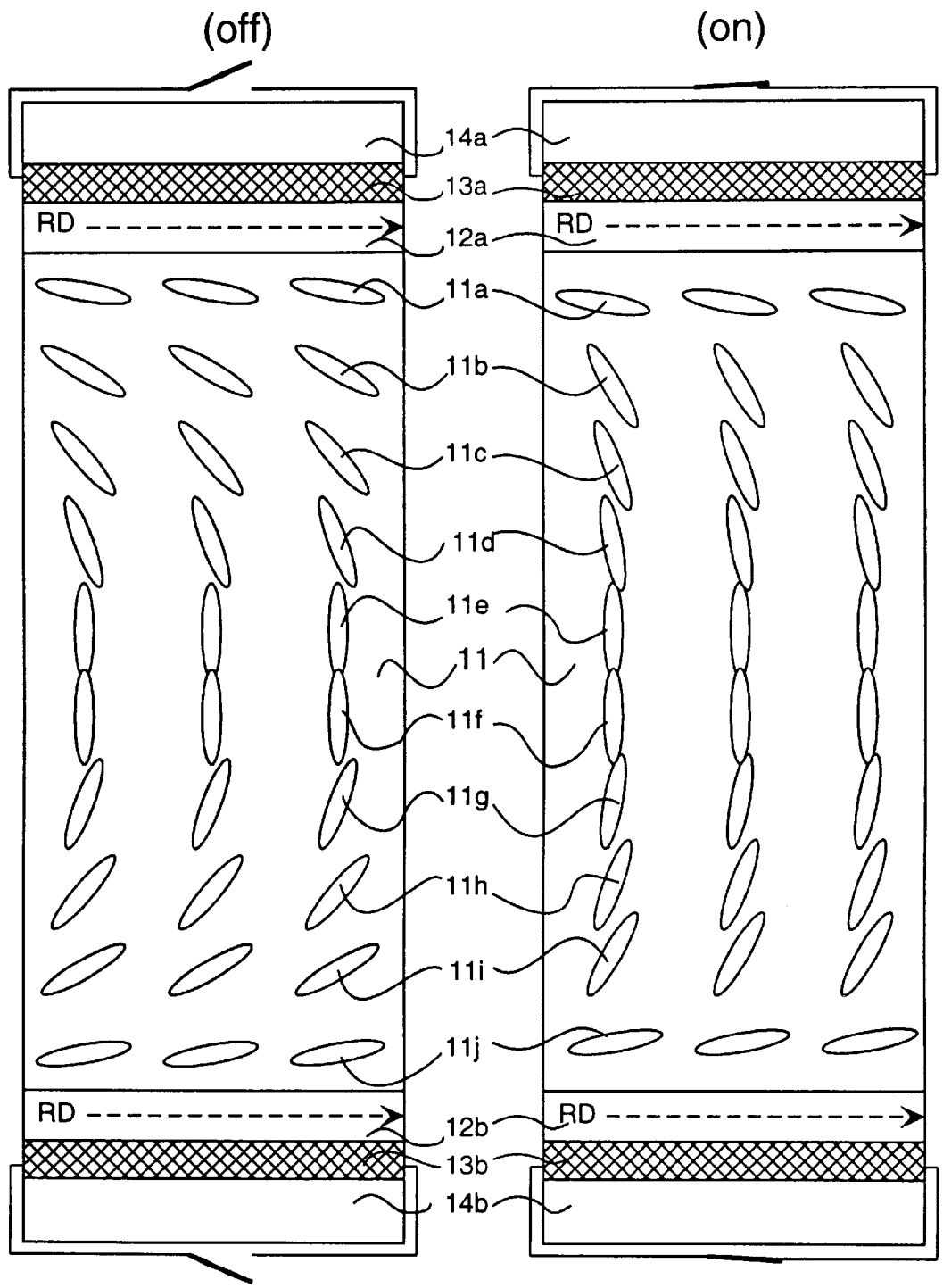
FIG. 1 is a sectional view schematically illustrating alignment of liquid crystal molecules in a liquid crystal cell of a bend alignment mode.

A liquid crystal display and an ellipsoidal polarizing plate are described by referring to the drawings.

FIG. 1 is a sectional view schematically illustrating alignment of liquid crystal molecules in a liquid crystal cell of a bend alignment mode.

As is shown in FIG. 1, a bend alignment liquid crystal cell comprises an upper substrate (14a), a lower substrate (14b) and liquid crystal compounds (11) sealed between the substrates. The liquid crystal compounds (11) used in a bend alignment liquid crystal cell generally has a positive dielectric constant anisotropy. Each of the upper substrate (14a) and lower substrate (14b) has an orientation layer (12a, 12b) and an electrode (13a, 13b). The orientation layer has a function of aligning the rod-like liquid crystal molecules (11a to 11j). RD in FIG. 1 means the rubbing direction of the orientation layer. The electrode has a function of applying voltage to the rod-like liquid crystal molecules (11a to 11j).

As is shown in (off) of FIG. 1, the alignment of the liquid crystal molecules (11a to 11e) near the upper substrate (14a) is substantially antiparallel (symmetrical) to the alignment of the molecules (11f to 11j) near the lower substrate (14b) when the applied voltage is low. The liquid crystal molecules (11a, 11b, 11i, 11j) neighboring the substrates (14a, 14b) are essentially horizontally aligned, while the liquid crystal molecules (11d to 11g) centered in the liquid crystal cell are essentially vertically aligned.

As is shown in (on) of FIG. 1, the liquid crystal molecules (11a, 11j) neighboring the substrates (14a, i4b) are still essentially horizontally aligned when the applied voltage is high. The liquid crystal molecules (11e, 11f) centered in the liquid crystal cell are still essentially vertically aligned. The alignment of the other liquid crystal molecules (11b, 11c, 11d, 11g, 11h, 11i) is changed when the applied voltage is increased. The molecules are rather vertically aligned compared with the alignment of the off state. The alignment of the liquid crystal molecules (11a to 11e) near the upper substrate (14a) is still substantially antiparallel (symmetrical) to the alignment of the molecules (11f to 11j) near the lower substrate (14b) even if the applied voltage is high.

Figure 2:
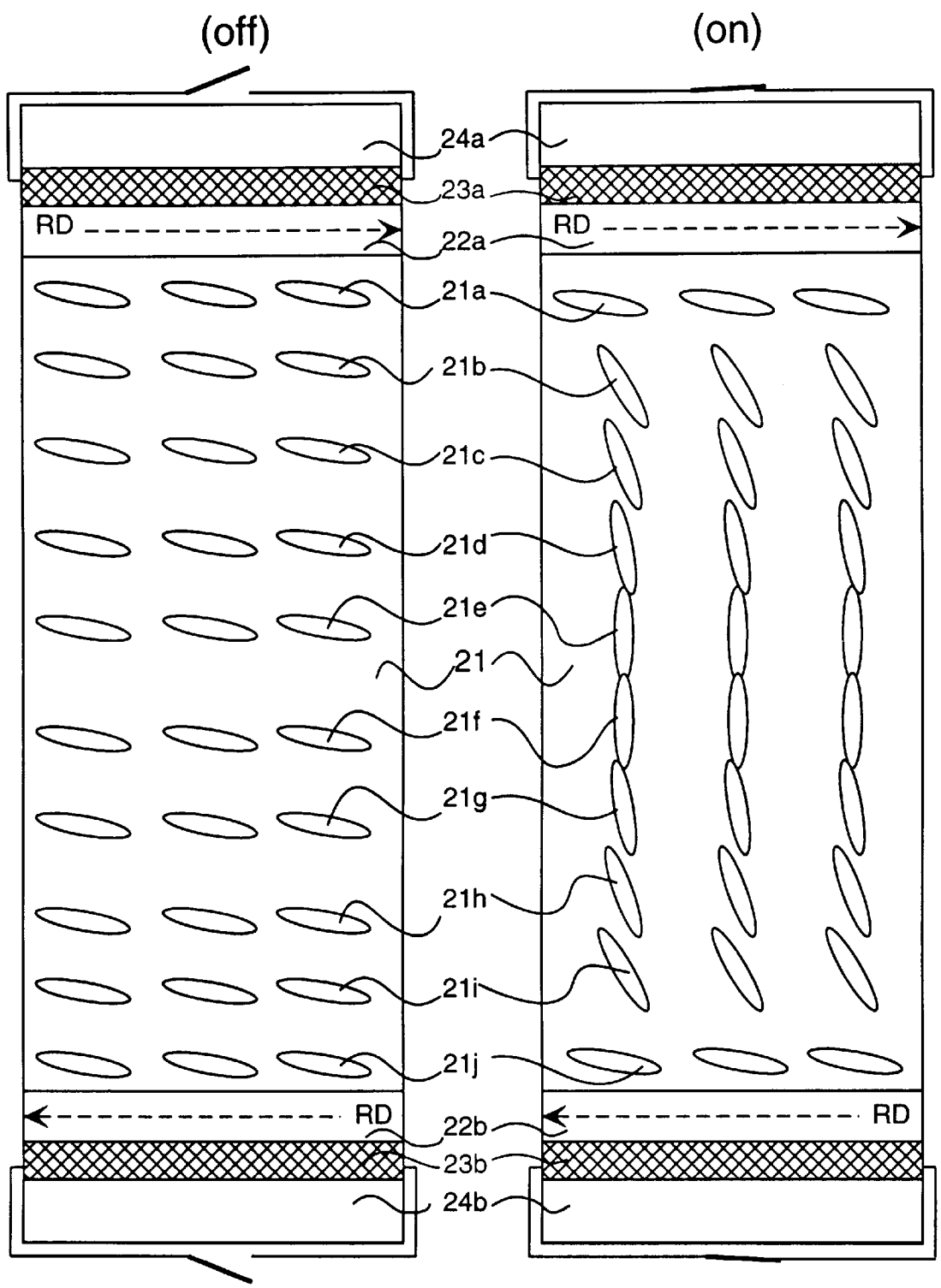
FIG. 2 is a sectional view schematically illustrating alignment of liquid crystal molecules in a liquid crystal cell of a homogeneous alignment mode.

FIG. 2 is a sectional view schematically illustrating alignment of liquid crystal molecules in a liquid crystal cell of a homogeneous alignment mode.

As is shown in FIG. 2, a homogeneous alignment liquid crystal cell comprises an upper substrate (24a), a lower substrate (24b) and liquid crystal compounds (21) sealed between the substrates. The liquid crystal compounds (21) used in a homogeneous alignment liquid crystal cell generally has a positive dielectric constant anisotropy. Each of the upper substrate (24a) and lower substrate (24b) has an orientation layer (22a, 22b) and an electrode (23a, 23b). The orientation layer has a function of aligning the rod-like liquid crystal molecules (21a to 21j). RD in FIG. 2 means the rubbing direction of the orientation layer. The electrode has a function of applying voltage to the rod-like liquid crystal molecules (21a to 21j).

As is shown in (off) of FIG. 2, the liquid crystal molecules (21a to 21j) are essentially horizontally aligned when the applied voltage is low. However, the aligned compounds are slightly slanted (pretilted) to a direction. The slanted compounds can be aligned to the pretilted direction when voltage is applied to the liquid crystal cell As is shown in (on) of FIG. 2, the liquid crystal molecules (21a to 21j) are rather vertically aligned when the applied voltage is high. However, the liquid crystal molecules (21a, 21j) neighboring the substrates (24a, 24b) are still essentially horizontally aligned when the applied voltage is high. The liquid crystal molecules (21d to 21g) centered in the liquid crystal cell are essentially vertically aligned.

Figure 3:
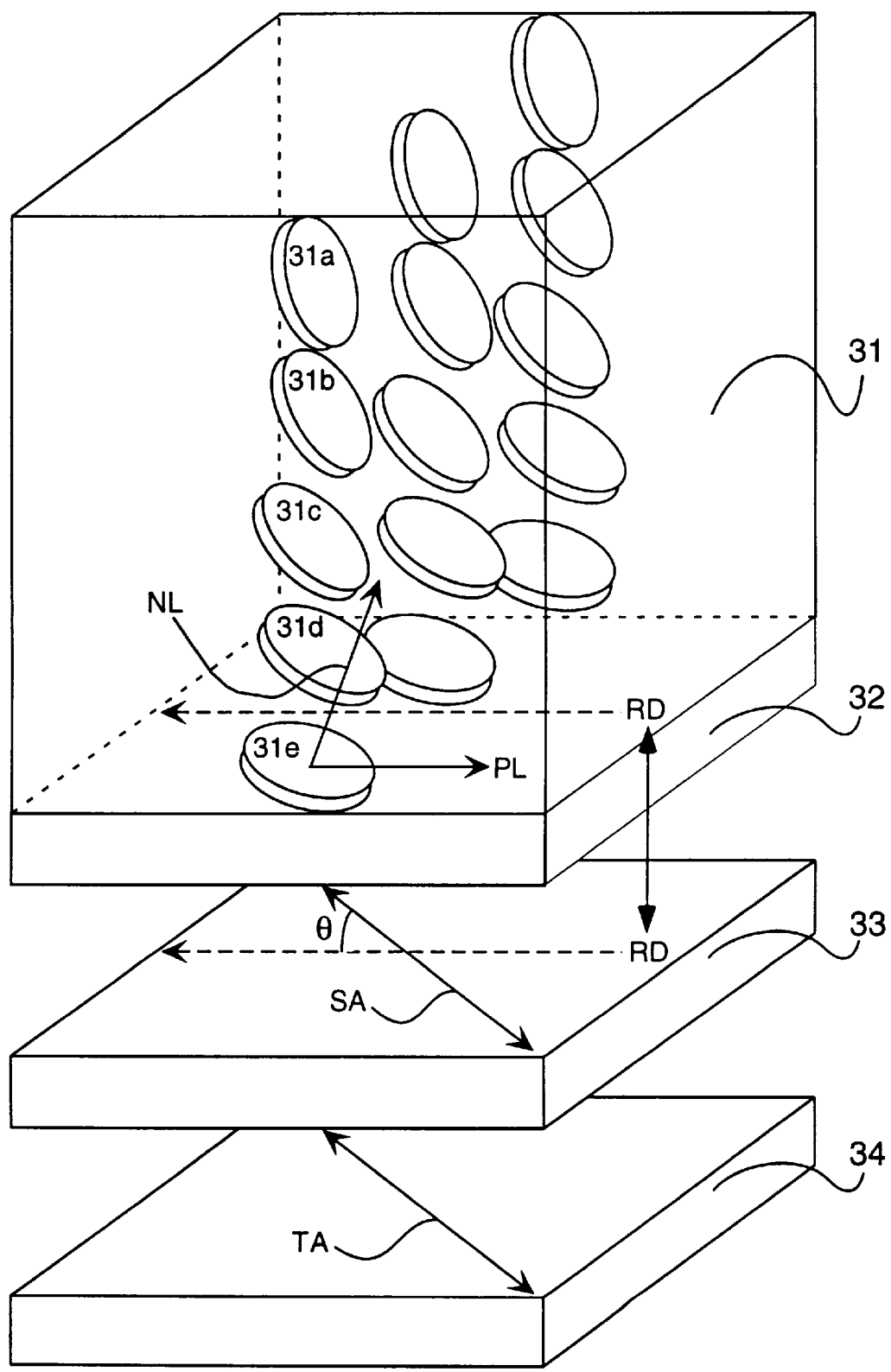
FIG. 3 schematically illustrates an ellipsoidal polarizing plate according to the present invention.

FIG. 3 schematically illustrates an ellipsoidal polarizing plate according to the present invention.

As is shown in FIG. 3, an ellipsoidal polarizing plate comprises a lamination of an optically anisotropic layer (31)

containing discotic compounds (31a to 31e), an optically anisotropic transparent substrate (33) and a polarizing membrane (34). The ellipsoidal polarizing plate shown in FIG. 3 further comprises an orientation layer (32) between the optically anisotropic layer (31) and the transparent substrate (33).

The discotic compounds (31a to 31e) contained in the optically anisotropic layer (31) are planer molecules. Each of the molecules has only one plane, namely discotic plane. The discotic planes are inclined to planes parallel to the surface of the transparent substrate (33). The angle between the discotic planes and the paralleled planes are inclined. As the distance between the molecule and the orientation layer (32) increases along a normal line of the transparent substrate (33), the inclined angles increase. The average inclined angle is preferably in the range of 15 to 50°. An ellipsoidal polarizing plate has a function of improving the viewing angle. The function can be further improved where the inclined angles are changed as is shown in FIG. 3. The ellipsoidal polarizing plate shown in FIG. 3 has another function of preventing an image from reversion, gray-scale inversion and color contamination of a displayed image.

The average of directions (PL) obtained by projecting normal lines (NL) of discotic planes of the discotic compounds (31a to 31e) on plane of the substrate (33) is antiparallel to the rubbing direction (RD) of the orientation layer (32). According to the present invention, an angle between a normal discotic direction (the average of PL directions) and a slow axis in plane of the transparent substrate is essentially adjusted to 45°. In preparation of the ellipsoidal polarizing plate, an angle (θ) between the rubbing direction (RD) of the orientation layer (32) and the slow axis (SA) in plane of the transparent substrate (33) is essentially adjusted to 45°.

Further, the transparent substrate (33) and the polarizing membrane (34) are so arranged that a slow axis (SA) in plane of the transparent substrate is essentially parallel to or essentially perpendicular to a transmission axis (TA) in plane of the polarizing membrane. In the ellipsoidal polarizing plate shown in FIG. 3, the slow axis (SA) in plane of the transparent substrate (33) is essentially parallel to the transmission axis (TA) in plane of the polarizing membrane (34). The slow axis (SA) in plane of the transparent substrate (33) generally corresponds to the stretching direction of the transparent substrate (33). The transmission axis (TA) in plane of the polarizing membrane (34) is generally perpendicular to the stretching direction of the polarizing membrane (34).

Figure 4:
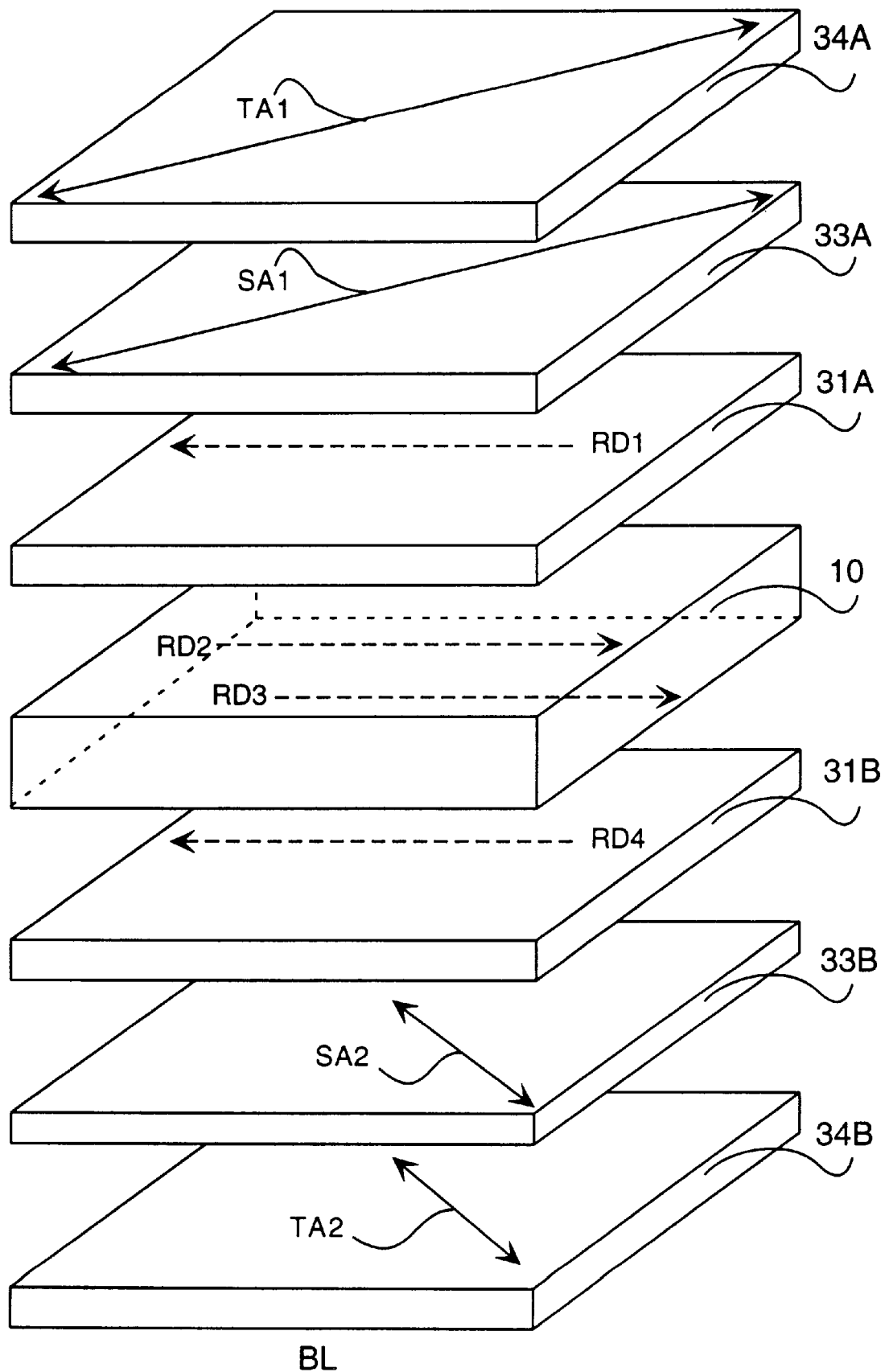
FIG. 4 schematically illustrates alliquid crystal display of a bend alignment mode according to the present invention.

FIG. 4 schematically illustrates a liquid crystal display of a bend alignment mode according to the present invention.

The liquid crystal display shown in FIG. 4 comprises a liquid crystal cell of a bend alignment mode (10), two polarizing elements (31A to 34A, 31B to 34B) arranged on both sides of the liquid crystal cell and a back light (BL).

The liquid crystal cell of the bend alignment mode (10) corresponds to the liquid crystal cell shown in FIG. 1. The rubbing directions (RD2, RD3) in the liquid crystal cell (10) are identical (parallel to each other).

The ellipsoidal polarizing plate comprises a lamination of an optically anisotropic layer (31A, 31B), a transparent substrate (33A, 33B) and a polarizing membrane (34A, 34B) in this order from the side of the liquid crystal cell (10). The rubbing directions (RD1, RD4) of the discotic compound of the optically anisotropic layer (31A, 31B) are antiparallel to the rubbing directions (RD2, RD3) in the liquid crystal cell (10). The rubbing directions (RD1, RD4) of the discotic compounds are antiparallel to the average of directions obtained by projecting normal lines of discotic planes of the discotic compounds on plane of the substrate. The angles between the rubbing directions (RD1, RD4) and the slow axes (SA1, SA2) in plane of the transparent substrates (33A, 33B) are essentially 45° in the same plane. The angles between the rubbing directions (RD1, RD4) and the transmission axes (TA1, TA2) in plane of the polarizing membranes (34A, 34B) are also essentially 45° in the same plane. The polarizing membranes (34A, 34B) are so arranged the transmission axes (TA1, TA2) are perpendicular to each other (crossed nicols arrangement).

Figure 5:
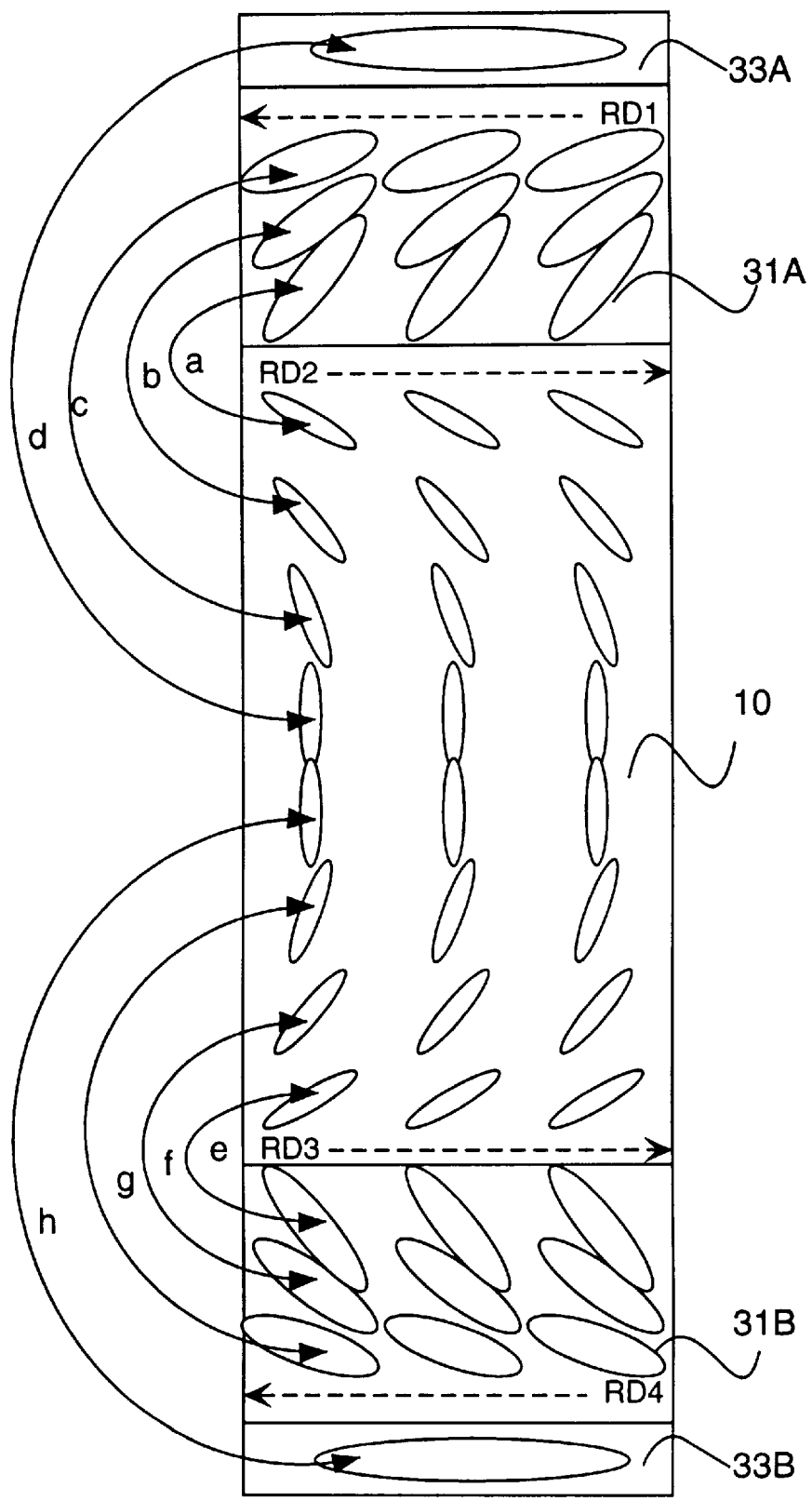
FIG. 5 schematically illustrates a relation of optical compensation in a liquid crystal display of a bend alignment mode.

FIG. 5 schematically illustrates a relation of optical compensation in a liquid crystal display of a bend alignment mode.

As is shown in FIG. 5, the bend alignment liquid crystal cell (10) is optically compensated with cooperation between optically anisotropic layers (31A, 31B) and optically anisotropic transparent substrates (33A, 33B) in the liquid crystal display of the present invention.

The rubbing directions (RD1, RD4) of the discotic compounds of the optically anisotropic layers (31A, 31B) are antiparallel to the rubbing directions (RD2, RD3) of the liquid crystal cell. Accordingly, the liquid crystal molecules of the bend alignment liquid crystal cell (10) is optically compensated by the corresponding (shown as the relations a to c and e to g) discotic compounds in the optically anisotropic layers (31A, 31B). The optical anisotropic transparent substrates (33A, 33B) correspond (shown as the relations d and h) to the essentially vertically aligned liquid crystal molecule centered in the bend alignment liquid crystal cell (10). The ellipsoids contained in the transparent substrates (33A, 33B) mean refractive index ellipsoids caused by optical anisotropy of the transparent substrates.

Figure 6:
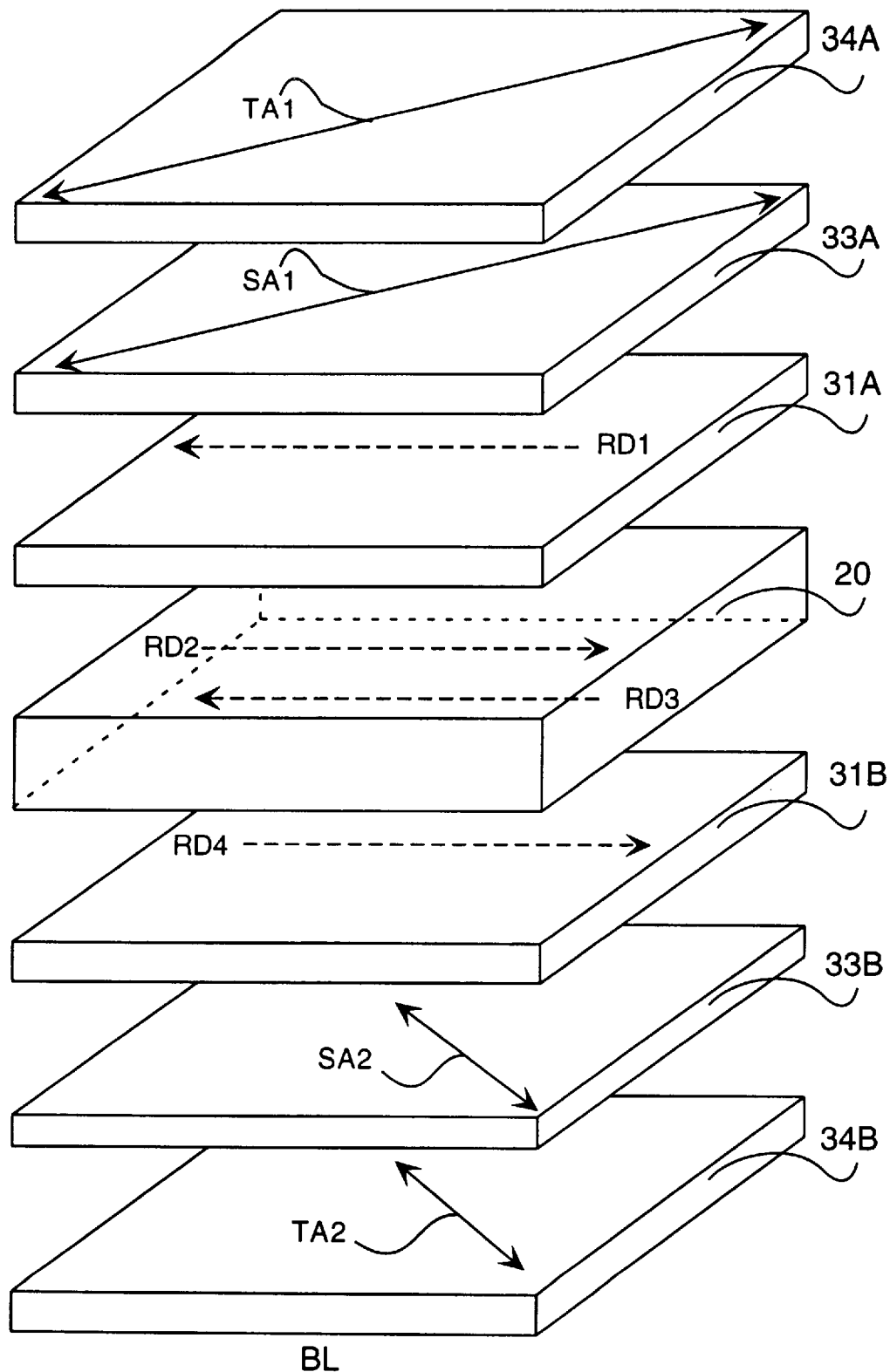
FIG. 6 schematically illustrates a liquid crystal display of a homogeneous alignment mode according to the present invention.

FIG. 6 schematically illustrates a liquid crystal display of a homogeneous alignment mode according to the present invention.

The liquid crystal display shown in FIG. 6 comprises a liquid crystal cell of a homogeneous alignment mode (20), two polarizing elements (31A to 34A, 31B to 34B) arranged on both sides of the liquid crystal cell and a back light (BL).

The liquid crystal cell of the homogeneous alignment mode (20) corresponds to the liquid crystal cell shown in FIG. 2. The rubbing directions (RD2, RD3) in the liquid crystal cell (20) are antiparallel to each other.

The ellipsoidal polarizing plate comprises a lamination of an optically anisotropic layer (31A, 31B), a transparent substrate (33A, 33B) and a polarizing membrane (34A, 34B) in this order from the side of the liquid crystal cell (20). The rubbing directions (RD1, RD4) of the discotic compound of the optically anisotropic layer (31A, 31B) are antiparallel to the rubbing directions (RD2, RD3) in the liquid crystal cell (20). The rubbing directions (RD1, RD4) of the discotic compounds are antiparallel to the average of directions obtained by projecting normal lines of discotic planes of the discotic compounds on plane of the substrate. The angles between the rubbing directions (RD1, RD4) and the slow axes (SA1, SA2) in plane of the transparent substrates (33A, 33B) are essentially 45° in the same plane. The angles between the rubbing directions (RD1, RD4) and the transmission axes (TA1, TA2) in plane of the polarizing membranes (34A, 34B) are also essentially 45° in the same plane. The polarizing membranes (34A, 34B) are so arranged the transmission axes (TA1, TA2) are perpendicular to each other (crossed nicols arrangement).

Figure 7:
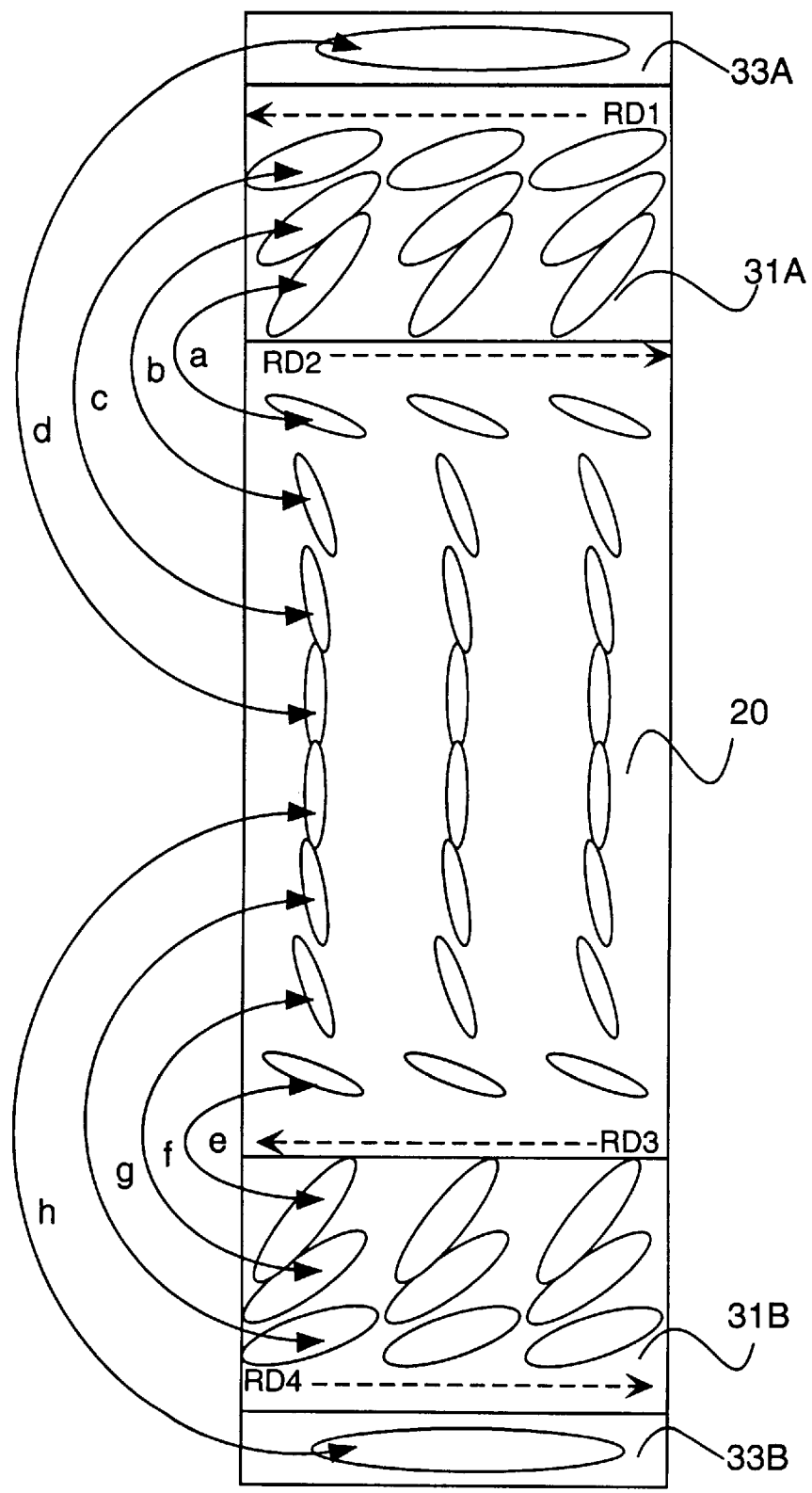
FIG. 7 schematically illustrates a relation of optica compensation in a liquid crystal display of a homogeneous alignment mode.

FIG. 7 schematically illustrates a relation of optical compensation in a liquid crystal display of a homogeneous alignment mode.

As is shown in FIG. 7, the homogeneous alignment liquid crystal cell (20) is optically compensated with cooperation between optically anisotropic layers (31A, 31B) and optically anisotropic transparent substrates (33A, 33B) in the liquid crystal display of the present invention.

The rubbing directions (RD1, RD4) of the discotic compounds of the optically anisotropic layers (31A, 31B) are antiparallel to the rubbing directions (RD2, RD3) of the liquid crystal cell. Accordingly, the liquid crystal molecules of the bend alignment liquid crystal cell (20) is optically compensated by the corresponding (shown as the relations a to c and e to g) discotic compounds in the optically anisotropic layers (31A, 31B). The optical anisotropic transparent substrates (33A, 33B) correspond (shown as the relations d and h) to the essentially vertically aligned liquid crystal molecule centered in the bend alignment liquid crystal cell (20). The ellipsoids contained in the transparent substrates (33A, 33B) mean refractive index ellipsoids caused by optical anisotropy of the transparent substrates.

Figure 8:
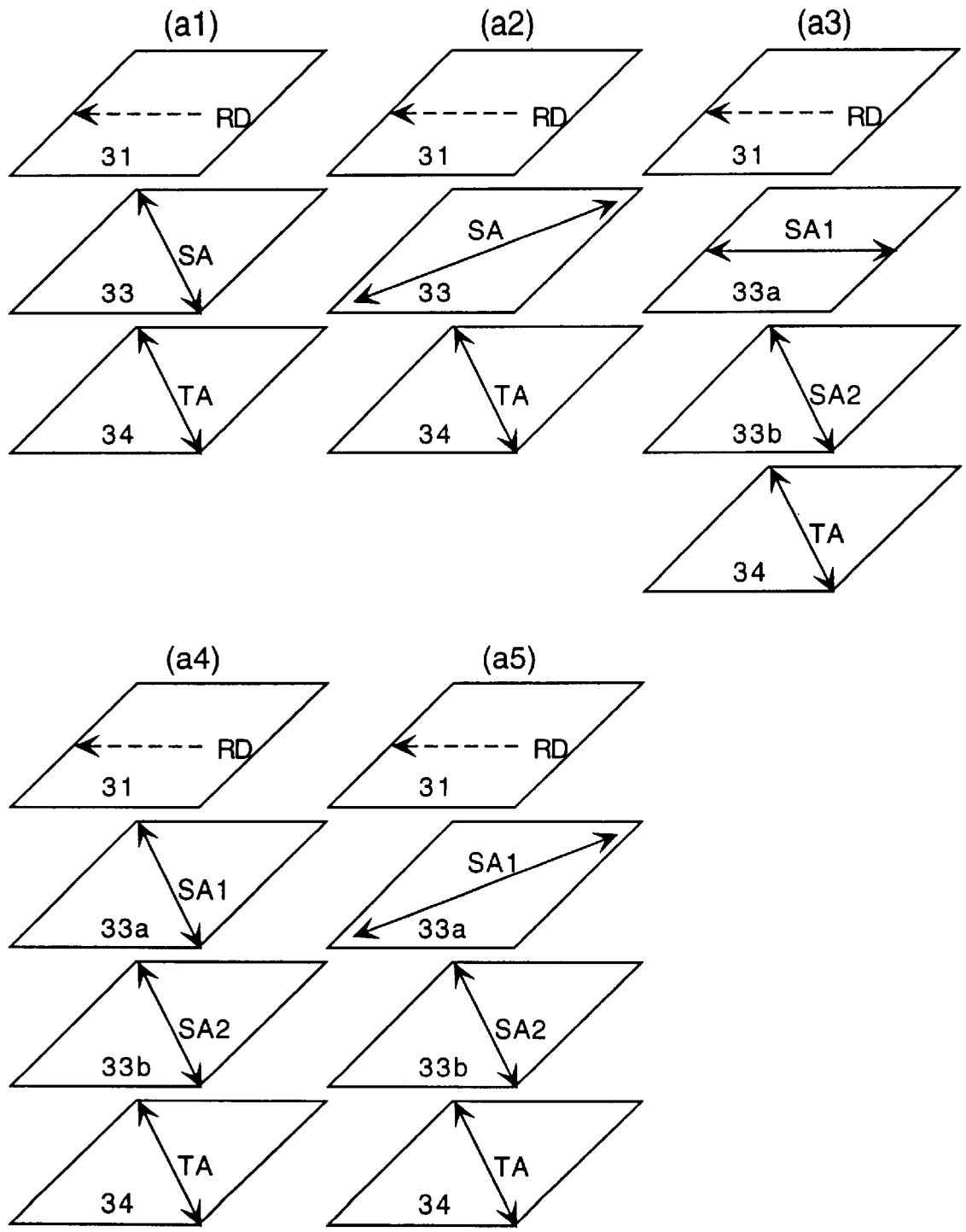
FIG. 8 schematically illustrates various embodiments of an ellipsoidal polarizing plate.

FIG. 8 schematically illustrates various embodiments of an ellipsoidal polarizing plate.

The embodiment (a1) corresponds to the most basic ellipsoidal polarizing plate shown in FIG. 3. The embodiment (a1) comprises a lamination of an optically anisotropic layer (31) containing discotic compounds, an optically anisotropic transparent substrate (33) and a polarizing membrane (34) in this order. The angle between the rubbing direction (RD) of the discotic compounds and the slow axis (SA) of the transparent substrate (33) is essentially 45°. The slow axis (SA) of the transparent substrate (33) is essentially parallel to the transmission axis (TA) of the polarizing membrane (34).

The embodiment (a2) comprises a lamination of an optically anisotropic layer (31) containing discotic compounds, an optically anisotropic transparent substrate (33) and a polarizing membrane (34) in this order. The angle between the rubbing direction (RD) of the discotic compounds and the slow axis (SA) of the transparent substrate (33) is essentially 45°. The slow axis (SA) of the transparent substrate (33) is essentially perpendicular to the transmission axis (TA) of the polarizing membrane (34).

The embodiment (a3) has two transparent substrates (33a, 33b). According to the present invention, at least one substrate (33b) should satisfy the above-described arrangement with an optically anisotropic layer (31) and a polarizing membrane (34). Therefore, the angle between the rubbing direction (RD) of the discotic compounds and the slow axis (SA2) of one transparent substrate (33b) is essentially 45°. The slow axis (SA2) of the transparent substrate (33b) is essentially parallel to the transmission axis (TA) of the polarizing membrane (34). The slow axis (SA1) of the other transparent substrate (33a) is essentially parallel to the rubbing direction (RD) of the discotic compounds in the same manner as in prior art.

The embodiment (a4) has two transparent substrates (33a, 33b), each of which satisfies the above-described arrangement with an optically anisotropic layer (31) and a polarizing membrane (34). Therefore, the angle between the rubbing direction (RD) of the discotic compounds and the slow axes (SA1, SA2) of the transparent substrates (33a, 33b) is essentially 45°. The slow axes (SA1, SA2) of the transparent substrates (33a, 33b) are essentially parallel to the transmission axis (TA) of the polarizing membrane (34).

The embodiment (a5) also has two transparent substrates (33a, 33b), each of which satisfies the above-described arrangement with an optically anisotropic layer (31) and a polarizing membrane (34). Therefore, the angle between the rubbing direction (RD) of the discotic compounds and the slow axes (SA1, SA2) of the transparent substrates (33a, 33b) is essentially 45°. The slow axis (SA1) of the transparent substrate (33a) near the optically anisotropic layer (31) is essentially perpendicular to the transmission axis (TA) of the polarizing membrane (34). The slow axis (SA2) of the transparent substrate (33b) near the polarizing membrane (34) is essentially parallel to the transmission axis (TA) of the polarizing membrane (34).

Figure 9:
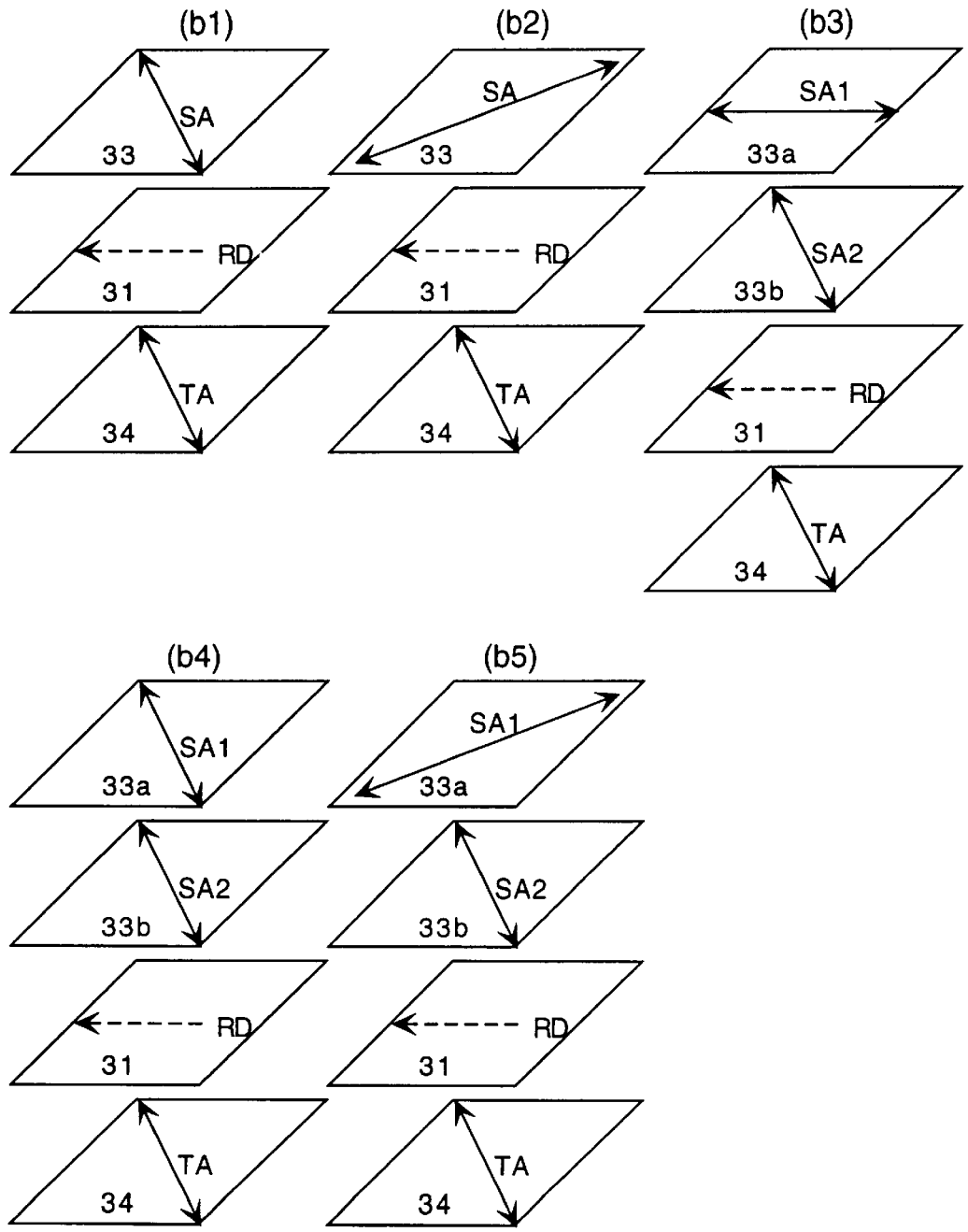
FIG. 9 schematically illustrates other various embodiments of an ellipsoidal polarizing plate.

FIG. 9 schematically illustrates other various embodiments of an ellipsoidal polarizing plate.

The embodiment (b1) comprises a lamination of an optically anisotropic transparent substrate (33), an optically anisotropic layer (31) containing discotic compounds and a polarizing membrane (34) in this order. The angle between the rubbing direction (RD) of the discotic compounds and the slow axis (SA) of the transparent substrate (33) is essentially 45°. The slow axis (SA) of the transparent substrate (33) is essentially parallel to the transmission axis (TA) of the polarizing membrane (34).

The embodiment (b2) comprises a lamination of an optically anisotropic transparent substrate (33), an optically anisotropic layer (31) containing discotic compounds and a polarizing membrane (34) in this order. The angle between the rubbing direction (RD) of the discotic compounds and the slow axis (SA) of the transparent substrate (33) is essentially 45°. The slow axis (SA) of the transparent substrate (33) is essentially perpendicular to the transmission axis (TA) of the polarizing membrane (34).

The embodiment (b3) has two transparent substrates (33a, 33b). According to the present invention, at least one substrate (33b) should satisfy the above-described arrangement with an optically anisotropic layer (31) and a polarizing membrane (34). Therefore, the angle between the rubbing direction (RD) of the discotic compounds and the slow axis (SA2) of one transparent substrate (33b) is essentially 45°. The slow axis (SA2) of the transparent substrate (33b) is essentially parallel to the transmission axis (TA) of the polarizing membrane (34). The slow axis (SA1) of the other transparent substrate (33a) is essentially parallel to the rubbing direction (RD) of the discotic compounds in the same manner as in prior art.

The embodiment (b4) has two transparent substrates (33a, 33b), each of which satisfies the above-described arrangement with an optically anisotropic layer (31) and a polarizing membrane (34). Therefore, the angle between the rubbing direction (RD) of the discotic compounds and the slow axes (SA1, SA2) of the transparent substrates (33a, 33b) is essentially 45°. The slow axes (SA1, SA2) of the transparent substrates (33a, 33b) are essentially parallel to the transmission axis (TA) of the polarizing membrane (34).

The embodiment (b5) also has two transparent substrates (33a, 33b), each of which satisfies the above-de-scribed arrangement with an optically anisotropic layer (31) and a polarizing membrane (34). Therefore, the angle between the rubbing direction (RD) of the discotic compounds and the slow axes (SA1, SA2) of the transparent substrates (33a, 33b) is essentially 45°. The slow axis (SA1) of the outermost transparent substrate (33a) is essentially perpendicular to the transmission axis (TA) of the polarizing membrane (34). The slow axis (SA2) of the transparent substrate (33b) near the optically anisotropic layer (31) and the polarizing membrane (34) is essentially parallel to the transmission axis (TA) of the polarizing membrane (34).

[Optical characteristics of ellipsoidal polarizing plate]

The ellipsoidal polarizing plate comprises an optically anisotropic layer containing discotic compounds, an optically anisotropic transparent substrate and a polarizing membrane.

The optical anisotropic layer has a direction of the minimum retardation, which is preferably not present in plane of the layer, and is also preferably not present along a normal line of the layer. The optically anisotropic layer also preferably does not have a direction in which the retardation value is 0 (optical axis).

The important optical characteristics of the optical anisotropic layer and the transparent support include the Re retardation value defined by the formula (1) and the Rth retardation value defined by the formula (2a) or (2b).

$$Re = (nx - ny) \times d \quad (1)$$

$$Rth = [(n2+n3)/2 - n1] \times d \quad (2a)$$

$$Rth = [(nx+ny)/2 - nz] \times d \quad (2b)$$

in which nx is a refractive index of a slow axis in plane of the optically anisotropic layer or the transparent substrate; ny is a refractive index of a fast axis in plane of the optically anisotropic layer or the transparent substrate; n1 is the minimum principal refractive index of the optically anisotropic layer; each of n2 and n3 is the other principal refractive index of the optically anisotropic layer; nz is a refractive index of a thickness direction of the optically anisotropic layer or the transparent substrate; and d is a thickness of the optically anisotropic layer or the transparent substrate.

The Re retardation value of the optically anisotropic layer is preferably in the range of 10 to 100 nm. The Rth retardation value of the optically anisotropic layer is preferably in the range of 40 to 200 nm. The angle between a direction of the minimum retardation and a normal line in the optically anisotropic layer (β) is preferably in the range of 20 to 50°.

The preferred range of the retardation value of the transparent substrate depends on whether the ellipsoidal polarizing plate is used in a liquid crystal display of a bend alignment mode or a homogeneous alignment mode.

In the case that the ellipsoidal polarizing plate is used in a liquid crystal display of a bend alignment mode, the Re retardation value of the transparent substrate (or a lamination of the substrate where two or more substrates in combination) is preferably in the range of 5 to 100 nm, and the Rth retardation value is preferably in the range of 100 to 1,000 nm.

In the case that the ellipsoidal polarizing plate is used in a liquid crystal display of a homogeneous alignment mode, the Re retardation value of the transparent substrate (or a lamination of the substrate where two or more substrates in combination) is preferably in the range of 0 to 100 nm, and the Rth retardation value is preferably in the range of 10 to 1,000 nm.

In the case that two or more transparent substrates are used (particularly in a liquid crystal display of a bend alignment mode), a cellulose ester film and a polycarbonate film are preferably used in combination.

The Re retardation value of the cellulose ester film used in a liquid crystal display of a bend alignment mode is preferably in the range of 0 to 30 nm, and the Rth retardation value is preferably in the range of 10 to 100 nm. The Re retardation value of the polycarbonate film is preferably in the range of 5 to 100 nm, and the Rth retardation value is preferably in the range of 100 to 1,000 nm.

The liquid crystal display of the present invention is characterized in that the wavelength dependency of the optically compensatory effect is low. The low wavelength dependency of the optically compensatory effect means that the difference between the sum of the Re retardation values of the optically anisotropic layer and the transparent substrate (total value of the layer and the substrates where two ellipsoidal polarizing plates are used) and the Re retardation value of the liquid crystal display is less than 10 nm even if the values are measured at any wavelength in the range of 400 to 700. The values can easily be obtained by arranging the optically anisotropic layer, the transparent substrate and the polarizing membrane of the ellipsoidal polarizing plate according to the present invention.

[Optically anisotropic layer]

The optically anisotropic layer contains a discotic compound. The discotic compound preferably is negative uniaxial, and preferably is obliquely aligned. The discotic compound preferably has a hybrid alignment shown in FIG. 3, wherein the inclined angles (between the discotic planes and the planes parallel to the transparent substrate) are changed along a normal line of the transparent substrate. The discotic compound has an optic axis along a normal line of the discotic plane. The birefringence along the discotic plane is larger than that along the optic axis.

An optically anisotropic layer is preferably formed by aligning a discotic compound by an orientation layer, and fixing the alignment of the discotic compound. The discotic compound is fixed preferably by a polymerization reaction.

The minimum retardation value in the optically anisotropic layer is preferably larger than 0. In other words, a direction having retardation of 0 preferably is not present in the optically anisotropic layer.

The discotic (liquid crystal) compound is described in various documents (C. Destrade et al., Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic compound is described in Japanese Patent Provisional Publication No. 8(1996)-27284.

A polymerizable group should be bound to a discotic core of the discotic compound to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic compound having a polymerizable group preferably is a compound represented by the following formula (I).

$$D(-L-P)_n \quad (I)$$

in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

(D1) 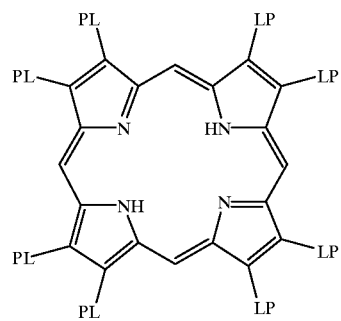
(D2) 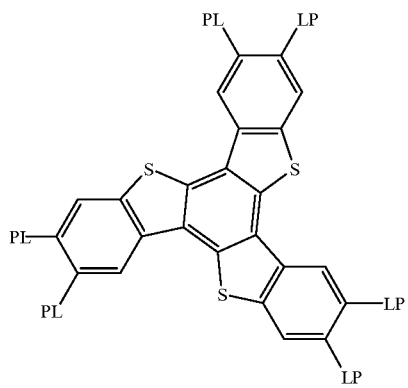
(D3) 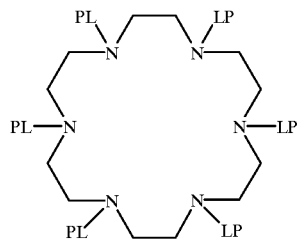
(D4) 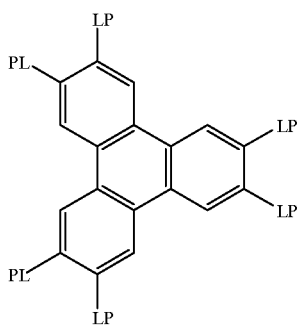
(D5) 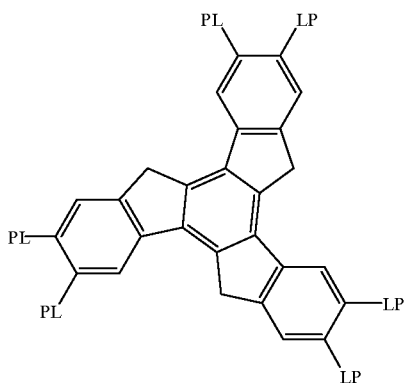
(D6) 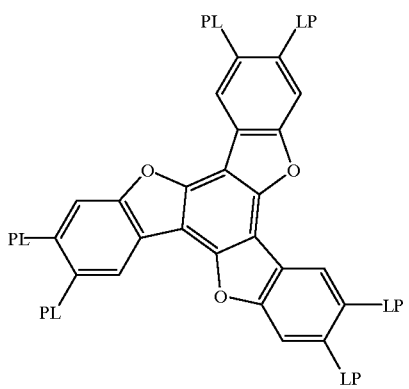
(D7) 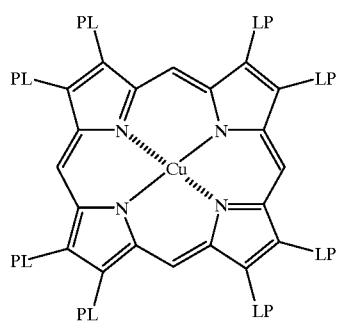
(D8) 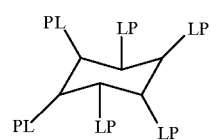

(D9)
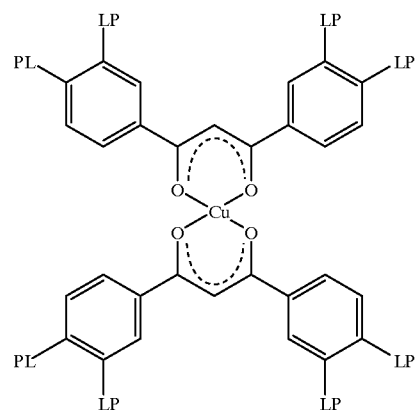
(10)
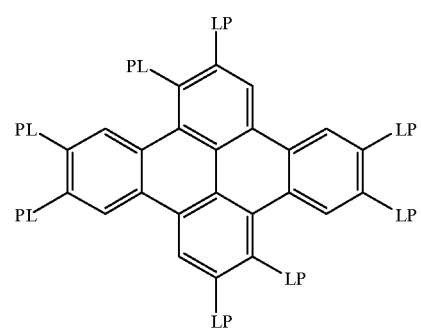
(D11)
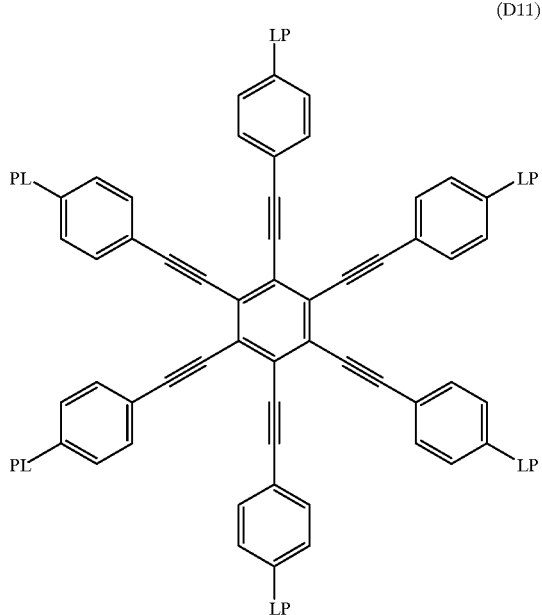
(D12)
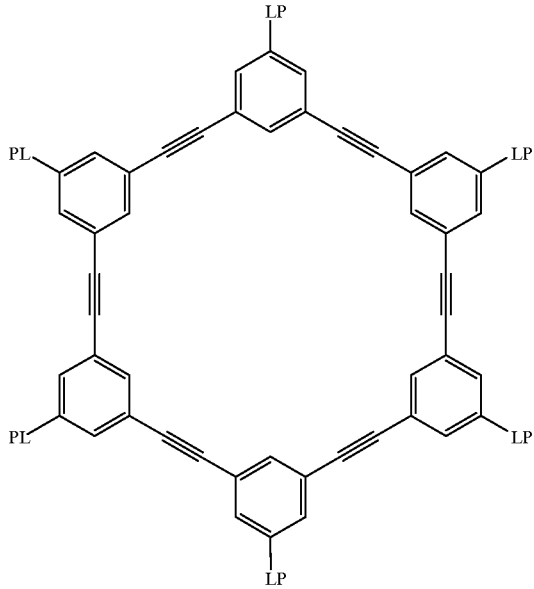
(D13)
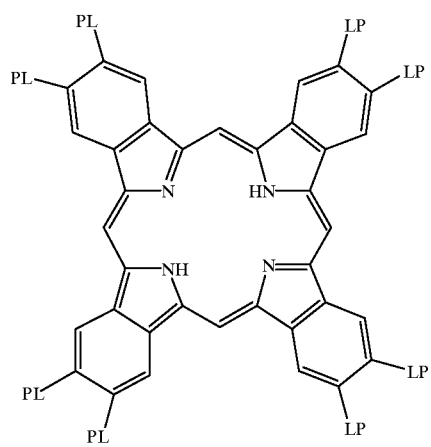
(D14)
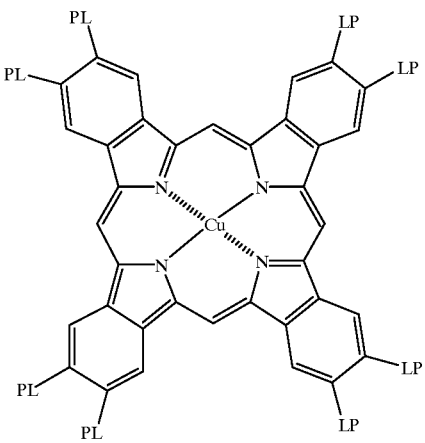

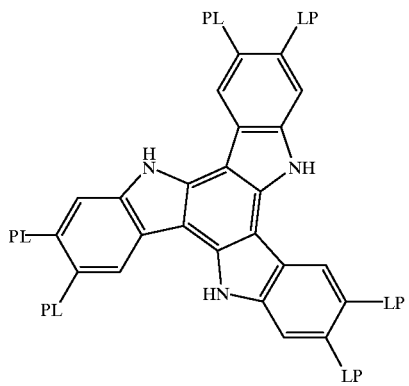

(D15)

In the formula (I), the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (P). The AL means an alkylene group or an alkenylene group. The AR means an arylene group. The alkylene group, the alkenylene group and the arylene group may have a substituent group (e.g., an alkyl group).

L1: —AL—CO—O—AL—O—CO—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AR—O—AL—CO—
L17: —O—CO—AR—O—AL—O—CO—
L18: —O—CO—AR—O—AL—O—AL—O—CO—
L19: —O—CO—AR—O—AL—O—AL—O—AL—O—CO—
L20: —S—AL—
L21: —S—AL—O—
L22: —S—AL—O—CO—
L23: —S—AL—S—AL—
L24: —S—AR—AL—

The polymerizable group (P) is determined by the polymerization reaction. Examples of the polymerizable groups (P) are shown below.

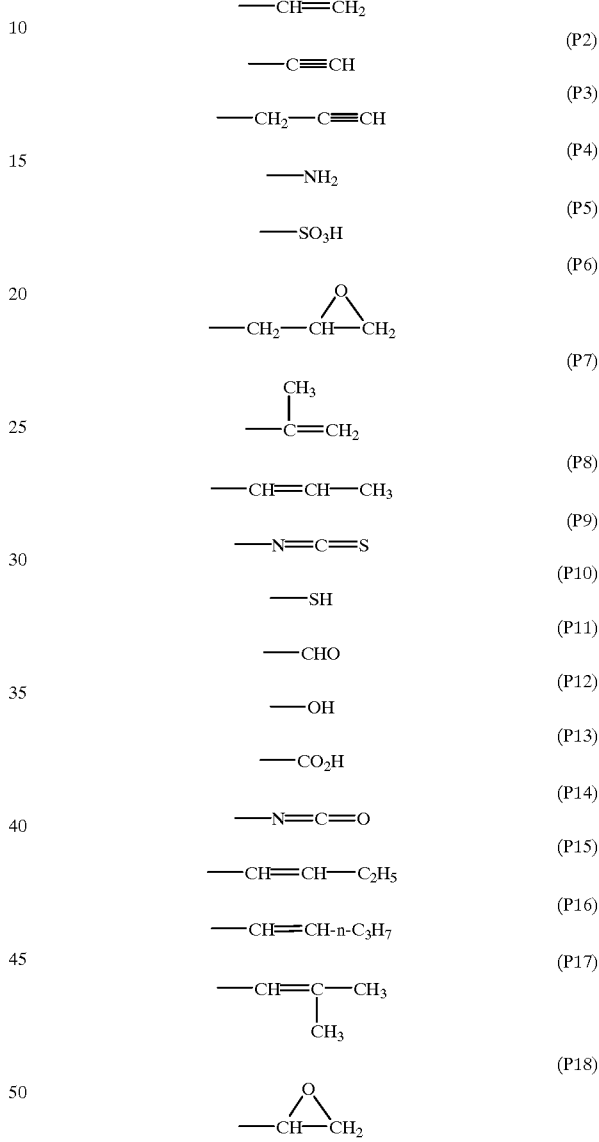

The polymerizable group (P) preferably is an unsaturated polymerizable group (P1, P2, P3, P7, P8, P15, P16, P17) or an epoxy group (P6, P18), more preferably is an unsaturated polymerizable group, and most preferably is an ethylenically unsaturated group (P1, P7, P8, P15, P16, P17).

In the formula (I), n is an integer of 4 to 12, which is determined by the chemical structure of the discotic core (D). The 4 to 12 combinations of L and P can be different from each other. However, the combinations are preferably identical.

An optically anisotropic layer can be formed by coating a solution containing the discotic compound, a polymerization initiator and other optional components on an orientation layer.

The optically anisotropic layer has a thickness preferably in the range of 0.5 to 100 µm, and more preferably in the range of 0.5 to 30 µm.

The aligned discotic compound is preferably fixed while keeping the alignment. The compound is fixed preferably by a polymerization reaction. The polymerization reaction can be classified a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray. The exposure energy is preferably in the range of 20 to 5,000 mJ per $cm^2$, and more preferably in the range of 100 to 800 mJ per $cm^2$. The light irradiation can be conducted while heating the layer to accelerate the photo polymerization reaction.

A protective layer can be provided on the optical anisotropic layer.

[Orientation layer]

The orientation layer has a function of aligning discotic compounds. The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethy-lammonium chloride, methyl stearate) according to a Lang-muir-Blodgett method. Further, the aligning function of the orientation layer can be activated by applying an electric or magnetic field to the layer or irradiating the layer with light.

The orientation layer is preferably formed by rubbing a polymer. The polymer preferably is polyvinyl alcohol. A denatured polyvinyl alcohol having a hydrophobic group is particularly preferred. The discotic compound can uniformly be aligned by introducing the hydrophobic group into polyvinyl alcohol because the hydrophobic group has an affinity with the discotic compound. The hydrophobic group is attached to the side chain or the end of the main chain of polyvinyl alcohol.

The hydrophobic group preferably is an aliphatic group (more preferably an alkyl group or an alkenyl group) having 6 or more carbon atoms or an aromatic group.

In the case that the hydrophobic group is attached to the end of the main chain, a linking group is preferably introduced between the hydrophobic group and the end of the main chain. Examples of the linking group include —S—, —C(CN)$R^1$—, —$NR^2$—, —CS— and combinations thereof. Each of $R^1$ and $R^2$ is hydrogen or an alkyl group having 1 to 6 carbon atoms, and preferably is an alkyl group having 1 to 6 carbon atoms.

In the case that the hydrophobic group is attached to the side chain, the acetyl group of the vinyl acetate units in polyvinyl alcohol is partially replaced with an acyl group (—CO—$R^3$) having 7 or more carbon atoms. $R^3$ is an aliphatic group having 6 or more carbon atoms or an aromatic group.

Commercially available denatured polyvinyl alcohols (e.g., MP103, MP203, R1130, Kuraray Co., Ltd.) can be used in the orientation layer.

The (denatured) polyvinyl alcohol has a saponification degree preferably of not smaller than 80%. The (denatured) polyvinyl alcohol has a polymerization degree preferably of not smaller than 200.

The rubbing treatment can be conducted by rubbing the layer with a paper or cloth several times along a certain direction. A cloth is preferred to a paper. The cloth preferably uniformly contains uniform (about length and thickness) fibers.

After aligning discotic compounds of the optically anisotropic layer by the orientation layer, the alignment of the discotic compounds can be kept even if the orientation layer is removed. Therefore, the orientation layer is not essential in a prepared ellipsoidal polarizing plate, while the orientation layer is essential in the preparation of the ellipsoidal polarizing plate.

In the case that the orientation layer is provided between the optically anisotropic layer and a transparent support, an undercoating layer (an adhesive layer) is preferably provided between the orientation layer and the transparent support.

[Transparent substrate]

A transparent substrate preferably is a polymer film made of a transparent polymer of positive inherent birefringence. The transparent substrate means that light transmittance is not less than 80%.

A polymer film made of a polymer of positive inherent birefringence usually has a (negative) refractive index ellipsoid. The film has one or two optic axes along a normal line of the film. In the present invention, the above-mentioned polymer film is preferably used as the substrate in combination with an optical anisotropic layer containing a discotic compound, which has a negative inherent birefringence and an optical axis along a normal line of a discotic plane.

Examples of the polymers include polycarbonate, polyarylate, polysulfone, polyethersulfone and cellulose ester (e.g., diacetyl cellulose, triacetyl cellulose). Polycarbonate and cellulose ester are preferred. The polymer film is formed preferably according to a solvent casting method.

A lamination of two or more transparent substrates can be used in the ellipsoidal polarizing plate. In the case that two or more transparent substrates are used (particularly in a liquid crystal display of a bend alignment mode), a cellulose acetate film (particularly a triacetyl cellulose film) and a polycarbonate film are preferably used in combination. The lamination preferably comprises a cellulose ester film and a polycarbonate film in this order from the side of an optical anisotropic layer.

The slow axis of the transparent substrate corresponds to a stretching direction of a polymer film. Even if a specific stretching treatment is not conducted, a polymer film is naturally stretched along a longitudinal direction of a polymer roll. The effect of the present invention can be obtained by an optical anisotropy of the naturally stretched film.

The transparent substrate has a thickness preferably in the range of 20 to 500 µm, and more preferably in the range of 50 to 200 µm.

The transparent substrate can be subjected to a surface treatment (e.g., glow discharge treatment, corona discharge treatment, ultraviolet (UV) treatment, flame treatment) to improve adhesion to a layer formed on the substrate (e.g., adhesive layer, orientation layer, optically anisotropic layer). A glow discharge treatment or a corona discharge treatment is preferred. Two or more surface treatments can be used in combination.

An adhesive layer (undercoating layer) can be provided on the transparent substrate. The adhesive layer is preferably formed by coating a hydrophilic polymer (e.g., gelatin) on the transparent substrate. The adhesive layer has a thickness preferably in the range of 0.1 to 2 μm, and more preferably in the range of 0.2 to 1 μm.

A protective layer can be provided on the back surface of the transparent substrate.

[Polarizing membrane]

An iodine type polarizing membrane, a (dichroic) dye type polarizing membrane or a polyene type polarizing membrane can be used in the present invention. The iodine type polarizing membrane and the dye type polarizing membrane is usually made of a polyvinyl alcohol film.

The transmission axis of the polarizing membrane is perpendicular to the stretching direction of the film.

The polarizing membrane is usually attached to a protective membrane. In the present invention, the transparent substrate can function as the protective membrane. In the case that a protective membrane is used in addition to the transparent substrate, the protective membrane preferably is an optically isotropic film such as a cellulose ester film, particularly a triacetyl cellulose film. In the case that the ellipsoidal polarizing plate of the present invention is used as only one of two polarizing elements, the other polarizing element preferably is a lamination of a polarizing membrane and a protective membrane.

[Preparation of ellipsoidal polarizing plate]

The ellipsoidal polarizing plate can be successively prepared in the following manner.

First, an orientation layer is formed on a transparent substrate. A rubbing treatment is conducted on the orientation layer. The angle between the rubbing direction and the direction of transferring the transparent substrate (corresponding to the slow axis) is adjusted to 45°. An optically anisotropic layer is formed on the orientation layer. The lamination is rolled up. While rolling the lamination down, the surface of the optically anisotropic layer is covered with a protective film, which protects optically anisotropic layer from scratch or dust. The lamination is rolled up again.

In the case that two transparent substrates are used, a second transparent substrate is attached on a surface of a first substrate of a rolled film by using an adhesive. In the case that three or more transparent substrates are used, the process is repeated by using an adhesive.

Finally, a polarizing membrane is attached on a surface of the outermost substrate by using an adhesive.

The attachment of the lamination film, the second substrate and the polarizing membrane is preferably conducted immediately after forming the optically anisotropic layer to reduce the repeating number of the processes of rolling the film up and down.

[Liquid crystal cell]

The ellipsoidal polarizing plate of the present invention is particularly effective in a liquid crystal display of a bend alignment mode or a homogeneous alignment mode.

In a liquid crystal cell of a bend alignment mode, liquid crystal molecules centered in the cell can be twisted (chiral alignment).

In the liquid crystal cell of a bend alignment mode, the product (Δn×d) of a refractive anisotropy (Δn) of the liquid crystal molecule and a thickness (d) of the liquid crystal layer of the liquid crystal cell is preferably in the range of 100 to 2,000 nm, more preferably in the range of 150 to 1,700 nm, and most preferably in the range of 500 to 1,500 nm to satisfy the brightness and the viewing angle.

In the liquid crystal cell of a homogeneous alignment mode, the product (Δn×d) of a refractive anisotropy (Δn) of the liquid crystal molecule and a thickness (d) of the liquid crystal layer of the liquid crystal cell is preferably in the range of 100 to 2,000 nm, more preferably in the range of 100 to 1,000 nm, and most preferably in the range of 100 to 700 nm to satisfy the brightness and the viewing angle.

The liquid crystal cell of a vertical alignment mode or a homogeneous alignment mode is used according to a normally white (NW) mode or a normally black (NE) mode.

EXAMPLE 1

(Formation of first transparent substrate)

On a triacetyl cellulose film (thickness: 100 μm), a gelatin undercoating layer (thickness: 0.1 μm) was formed to obtain a first transparent substrate.

The Re retardation value of the first transparent substrate (measured at the wavelength of 546 nm) was 0.6 nm, and the Rth retardation value was 35 nm.

(Formation of orientation layer)

A coating solution of the following composition was coated on the gelatin undercoating layer of the first transparent substrate by using a wire bar coater of #16. The coating amount was 28 ml per m². The coated layer was air dried at 60° C. for 60 seconds, and further air dried at 90° C. for 150 seconds to form an orientation layer. The formed layer was subjected to a rubbing treatment. The angle between the rubbing direction and the slow axis of the first transparent substrate (measured at the wavelength of 632.8 nm) was 45°.

| Coating solution for orientation layer | |
|---|---|
| The following denatured polyvinyl alcohol | 10 weight parts |
| Water | 371 weight parts |
| Methanol | 119 weight parts |
| Glutaric aldehyde (cross-linking agent) | 0.5 weight part |

(Denatured polyvinyl alcohol)

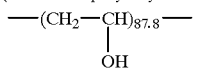

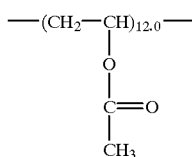

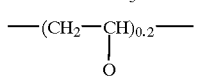

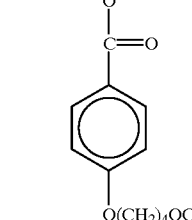

(Formation of optically anisotropic layer)

In 102 g of methyl ethyl ketone, 41.01 g of the following discotic (liquid crystal) compound, 4.06 g of trimethylolpropane triacrylate denatured with ethylene oxide (V#360, Osaka Organic Chemical Co., Ltd.), 0.90 g of cellulose acetate butyrate (CAB551-0.2, Eastman Chemical), 0.23 g of cellulose acetate butyrate (CAB531-1, Eastman Chemical), 1.35 g of a photopolymerization initiator (Irgacure 907, Ciba-Geigy) and 0.45 g of a sensitizer (Kayacure DETX, Nippon Kayaku Co., Ltd.) were dissolved to prepare a coating solution. The coating solution was coated on the orientation layer by using a wire bar of #3. The sheet was adhered to a metal frame, and heated in a thermostat at 130° C. for 2 minutes to align the discotic compound. The sheet was irradiated with an ultraviolet ray at 130° C. for 1 minute by using a high pressure mercury lamp of 120 W per cm. The sheet was cooled to room temperature to form an optically anisotropic layer.

The Re retardation value of the optically anisotropic layer (measured at the wavelength of 546 nm) was 38 nm. The average inclined angle of the discotic plane based on the surface of the first transparent substrate was 40°.

(Discotic compound)

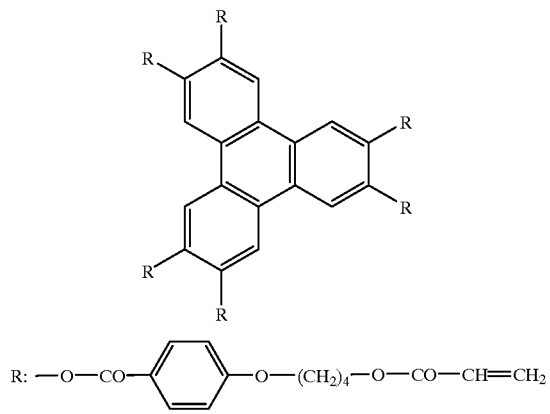

(Formation of second transparent substrate)

In dichloromethane, 2,2'-bis(4-hydroxyphenyl)propane polycarbonate resin (viscosity average molecular weight: 28,000) was dissolved to obtain a 18 wt. % solution. The obtained solution was defoamed under vacuum to obtain a dope. The dope was cast on a band, dried at 50° C. for 10 minutes, peeled from the band, and further dried at 100° C. for 10 minutes. The obtained film was stretched by 3.3% along a longitudinal direction at 170° C., and was stretched by 4.7% along a horizontal direction to obtain a biaxially stretched roll film (second transparent substrate) having the thickness of 80 μm. The longitudinal stretching was controlled by the difference between the rotating speeds of two chucking rolls. The horizontal stretching was controlled by the width of a tenter.

The Re retardation value of the second transparent substrate (measured at the wavelength of 546 nm) was 3 nm, and the Rth retardation value was 200 nm.

(Lamination of second transparent substrate)

On the surface of the first transparent substrate of the lamination (comprising the optically anisotropic layer and the first transparent substrate), the second transparent substrate was laminated by using an adhesive. The slow axis of the second transparent substrate (measured at the wavelength of 632.8 nm) was perpendicular to the slow axis of the first transparent substrate.

The Re retardation value of the obtained lamination was measured at the wavelength of 436 nm, 546 nm and 611.5 nm.

(Formation of ellipsoidal polarizing plate)

On the surface of the second transparent substrate of the lamination (comprising the optically anisotropic layer and the first and second transparent substrates), a polarizing membrane was laminated by using an adhesive. The transmission axis of the polarizing membrane was perpendicular to the slow axis of the first transparent substrate, and parallel to the slow axis of the second transparent substrate.

EXAMPLE 2

(Formation of second transparent substrate)

In dichloromethane, 2,2'-bis(4-hydroxyphenyl)propane polycarbonate resin (viscosity average molecular weight: 28,000) was dissolved to obtain a 18 wt. % solution. The obtained solution was defoamed under vacuum to obtain a dope. The dope was cast on a band, dried at 50° C. for 10 minutes, peeled from the band, and further dried at 100° C. for 10 minutes. The obtained film was stretched by 5.5% along a longitudinal direction at 170° C., and was stretched by 2.5% along a horizontal direction to obtain a biaxially stretched roll film (second transparent substrate) having the thickness of 80 μm. The longitudinal stretching was controlled by the difference between the rotating speeds of two chucking rolls. The horizontal stretching was controlled by the width of a tenter.

The Re retardation value of the second transparent substrate (measured at the wavelength of 546 nm) was 30 nm, and the Rth retardation value was 200 nm.

(Lamination of second transparent substrate)

On the surface of the first transparent substrate of the lamination (comprising the optically anisotropic layer and the first transparent substrate) prepared in Example 1, the second transparent substrate was laminated by using an adhesive. The slow axis of the second transparent substrate (measured at the wavelength of 632.8 nm) was perpendicular to the slow axis of the first transparent substrate.

The Re retardation value of the obtained lamination was measured at the wavelength of 436 nm, 546 nm and 611.5 nm.

(Formation of ellipsoidal polarizing plate)

On the surface of the second transparent substrate of the lamination (comprising the optically anisotropic layer and the first and second transparent substrates), a polarizing membrane was laminated by using an adhesive. The transmission axis of the polarizing membrane was perpendicular to the slow axis of the first transparent substrate, and parallel to the slow axis of the second transparent substrate.

Comparsion Example 1

(Formation of orientation layer)

The coating solution used in Example 1 was coated on the gelatin undercoating layer of the first transparent substrate prepared in Example 1 by using a wire bar coater of #16. The coating amount was 28 ml per m². The coated layer was air dried at 60° C. for 60 seconds, and further air dried at 90° C. for 150 seconds to form an orientation layer. The formed layer was subjected to a rubbing treatment. The rubbing direction was parallel to the slow axis of the first transparent substrate (measured at the wavelength of 632.8 nm).

(Formation of ellipsoidal polarizing plate)

An ellipsoidal polarizing plate was prepared in the same manner as in Example 1, except that the above-prepared orientation layer was used.

The Re retardation value of the lamination comprising the optically anisotropic layer and the first and second transparent substrates was measured at the wavelength of 436 nm, 546 nm and 611.5 nm.

(Optical characteristics of ellipsoidal polarizing plates)

The optical characteristics of the ellipsoidal polarizing plates prepared in Examples 1 & 2 and Comparison Example 1 are shown in the following Table 1.

TABLE 1

| Sam- | OA layer | | First substrate | | | | Second substrate | | | |
|---|---|---|---|---|---|---|---|---|---|---|
| ple | Re | β | Re | Rth | θ | α | Re | Rth | θ | α |
| Ex.1 | 38 | 40 | 0.6 | 35 | 45 | 90 | 3 | 200 | 45 | 0 |
| Ex.2 | 38 | 40 | 0.6 | 35 | 45 | 90 | 30 | 200 | 45 | 0 |
| C1 | 38 | 40 | 0.6 | 35 | 0 | 45 | 3 | 200 | 90 | 45 |

(Remark)
C: Comparison Example
OA: Optically anisotropic.
Re: Re retardation value (nm)
Rth: Rth retardation value (nm)
β: Average inclined angle (°) of discotic plane
θ: Angle (°) between the average of directions obtained by projecting normal lines of discotic planes of the discotic compounds on plane of the substrate (rubbing direction) and the slow axis of the transparent substrate (90° means perpendicular, and 0° means parallel)
α: Angle (°) between the slow axis of the transparent substrate and the transmission axis of the polarizing membrane (90° means perpendicular, and 0° means parallel)

EXAMPLE 3

(Formation of liquid crystal cell of bend alignment mode)

On a glass plate having an ITO electrode, a polyimide film (orientation layer) was attached, and subjected to a rubbing treatment. The two glass plates were placed by facing the orientation layer with each other. The rubbing direction on one glass plate was parallel to the rubbing direction on the other plate. The cell gap was 6 μm. A liquid crystal molecule having Δn of 0.1396 (ZLI1132, Merck & Co., Inc.) was injected into the cell gap to prepare a liquid crystal cell of a bend alignment mode.

The Re retardation value of the liquid crystal cell was measured at the wavelength of 436 nm, 546 nm and 611.5 nm while applying voltage (5 or 5.5 V) of a square wave (55 Hz) to the cell.

(Preparation of liquid crystal display)

Two ellipsoidal polarizing plates prepared in Example 1 were arranged on both sides of the liquid crystal cell of a bend alignment mode. The optically anisotropic layer of the ellipsoidal polarizing plate was faced with the glass plate of the liquid crystal cell. The rubbing direction of the orientation layer of the liquid crystal cell was antiparallel to the rubbing direction of the orientation layer of the optically anisotropic layer.

EXAMPLE 4

(Preparation of liquid crystal display)

Two ellipsoidal polarizing plates prepared in Example 2 were arranged on both sides of the liquid crystal cell of a bend alignment mode prepared in Example 3. The optically anisotropic layer of the ellipsoidal polarizing plate was faced with the glass plate of the liquid crystal cell. The rubbing direction of the orientation layer of the liquid crystal cell was antiparallel to the rubbing direction of the orientation layer of the optically anisotropic layer.

Comparison Example 2

(Preparation of liquid crystal display)

Two ellipsoidal polarizing plates prepared in comparison Example 1 were arranged on both sides of the liquid crystal cell of a bend alignment mode prepared in Example 3. The optically anisotropic layer of the ellipsoidal polarizing plate was faced with the glass plate of the liquid crystal cell. The rubbing direction of the orientation layer of the liquid crystal cell was antiparallel to the rubbing direction of the orientation layer of the optically anisotropic layer.

(Evaluation of liquid crystal displays)

The difference between the Re retardation values of the lamination (the optically anisotropic layer and the first and second transparent substrates) and the liquid crystal cell was calculated. The wavelength dependency was evaluated as the differences measured at the wavelength of 436 nm, 546 nm and 611.5. The results are set forth in Table 2. In Table 2, the wavelength dependency is shown as a relative value based on the result measured at the wave-length of 546 nm as the standard value (0).

Voltage (55 Hz) of a square wave was applied to the liquid crystal cell of the liquid crystal displays prepared in Examples 3 & 4 and Comparison Example 2. An image was displayed according to a normally white mode (white: 2 V, black: 5 V). A ratio of the transmittance (white/black) was measured as a contrast ratio. The upward, downward, leftward and rightward contrast ratios were measured. The viewing angle was evaluated as an angle that can view an image having a contrast ratio of not smaller than 10.

Further, the front chromaticity of the black image was measured.

Furthermore, the transmittance of the liquid crystal display was measured at the wavelength of 436 nm. The result was evaluated as a relative value based on the transmittance of a lamination of two polarizing membranes (paranicols arrangement) measured at the wavelength of 436 nm as the standard value (100%).

TABLE 2

| Sam- | Dependency | | | Viewing angle | | | | Chromat. | | T |
|---|---|---|---|---|---|---|---|---|---|---|
| ple | 436 | 546 | 611.5 | U | D | L | R | x | y | (%) |
| Ex.3 | 6.0 | 0 | −1.2 | 80+ | 59 | 57 | 57 | 0.151 | 0.204 | 1.10 |
| Ex.4 | 6.2 | 0 | −1.0 | 80+ | 70 | 73 | 73 | 0.150 | 0.205 | 1.08 |
| C2 | 20.2 | 0 | −6.4 | 80+ | 60 | 58 | 57 | 0.094 | 0.120 | 3.86 |

(Remark)
C: Comparison Example
U: Upward viewing angle (°)
D: Downward viewing angle (°)
L: Leftward viewing angle (°)
R: Rightward viewing angle (°)
80+: 80° or more
Chromat.: Front chromaticity
T: Relative transmittance

EXAMPLE 5

(Formation of ellipsoidal polarizing plate)

An ellipsoidal polarizing plate was prepared in the same manner as in Example 1, except that the second transparent support was not used.

Comparison Example 3

(Formation of ellipsoidal polarizing plate)

An ellipsoidal polarizing plate was prepared in the same manner as in Comparison Example 1, except that the second transparent support was not used.

(Optical characteristics of ellipsoidal polarizing plates)

The optical characteristics of the ellipsoidal polarizing plates prepared in Example 5 and Comparison Example 3 are shown in the following Table 3.

TABLE 3

| Sample No. | OA layer Re | β | Transparent substrate Re | Rth | θ | α |
|---|---|---|---|---|---|---|
| Ex. 5 | 38 | 40 | 0.6 | 35 | 45 | 90 |
| Comp. 3 | 38 | 40 | 0.6 | 35 | 0 | 45 |

(Remark)
OA: Optically anisotropic.
Re: Re retardation value (nm)
Rth: Rth retardation value (nm)
β: Average inclined angle (°) of discotic plane
θ: Angle (°) between the average of directions obtained by projecting normal lines of discotic planes of the discotic compounds on plane of the substrate (rubbing direction) and the slow axis of the transparent substrate (90° means perpendicular, and 0° means parallel)
α: Angle (°) between the slow axis of the transparent substrate and the transmission axis of the polarizing membrane (90° means perpendicular, and 0° means parallel)

EXAMPLE 6

(Formation of liquid crystal cell of homogeneous alignment mode)

On a glass plate having an ITO electrode, a polyimide film (orientation layer) was attached, and subjected to a rubbing treatment. The two glass plates were placed by facing the orientation layer with each other. The rubbing direction on one glass plate was antiparallel to the rubbing direction on the other plate. The cell gap was 3.7 μm. A liquid crystal molecule having Δn of 0.0988 (ZLI4792, Merck & Co., Inc.) was injected into the cell gap to prepare a liquid crystal cell of a homogeneous alignment mode.

The Re retardation value of the liquid crystal cell was measured at the wavelength of 436 nm, 546 nm and 611.5 nm while applying voltage (5 or 5.5 V) of a square wave (55 Hz) to the cell.

(Preparation of liquid crystal display)

Two ellipsoidal polarizing plates prepared in Example 5 were arranged on both sides of the liquid crystal cell of a bend alignment mode. The optically anisotropic layer of the ellipsoidal polarizing plate was faced with the glass plate of the liquid crystal cell. The rubbing direction of the orientation layer of the liquid crystal cell was antiparallel to the rubbing direction of the orientation layer of the optically anisotropic layer.

Comparison Example 4

(Preparation of liquid crystal display)

Two ellipsoidal polarizing plates prepared in Comparison Example 3 were arranged on both sides of the liquid crystal cell of a homogeneous alignment mode prepared in Example 6. The optically anisotropic layer of the ellipsoidal polarizing plate was faced with the glass plate of the liquid crystal cell. The rubbing direction of the orientation layer of the liquid crystal cell was antiparallel to the rubbing direction of the orientation layer of the optically anisotropic layer.

(Evaluation of liquid crystal displays)

The difference between the Re retardation values of the lamination (the optically anisotropic layer and the first and second transparent substrates) and the liquid crystal cell was calculated. The wavelength dependency was evaluated as the differences measured at the wavelength of 436 nm, 546 nm and 611.5. The results are set forth in Table 4. In Table 4, the wavelength dependency is shown as a relative value based on the result measured at the wave-length of 546 nm as the standard value (0).

Voltage (55 Hz) of a square wave was applied to the liquid crystal cell of the liquid crystal displays prepared in Example 6 and Comparison Example 4. An image was displayed according to a normally white mode (white: 2 V, black: 5 V). A ratio of the transmittance (white/black) was measured as a contrast ratio. The upward, downward, leftward and rightward contrast ratios were measured. The viewing angle was evaluated as an angle that can view an image having a contrast ratio of not smaller than 10.

Further, the front chromaticity of the black image was measured.

Furthermore, the transmittance of the liquid crystal display was measured at the wavelength of 436 nm. The result was evaluated as a relative value based on the transmittance of a lamination of two polarizing membranes (para nicols arrangement) measured at the wavelength of 436 nm as the standard value (100%).

TABLE 4

| Sample | Dependency | | | Viewing angle | | | | Chromat. | | T |
|---|---|---|---|---|---|---|---|---|---|---|
| | 436 | 546 | 611.5 | U | D | L | R | x | y | (%) |
| Ex.6 | 8.1 | 0 | −2.6 | 75 | 45 | 56 | 55 | 0.203 | 0.053 | 0.33 |
| C4 | 18.1 | 0 | −8.2 | 76 | 45 | 55 | 55 | 0.246 | 0.082 | 1.66 |

(Remark)
C: Comparison Example
U: Upward viewing angle (°)
D: Downward viewing angle (°)
L: Leftward viewing angle (°)
R: Rightward viewing angle (°)
Chromat.: Front chromaticity
T: Relative transmittance

I claim:

1. A liquid crystal display comprising a liquid crystal cell of a bend alignment mode and two polarizing elements respectively arranged on each side of the liquid crystal cell, at least one of said polarizing elements being an ellipsoidal polarizing plate comprising a lamination of an optically anisotropic layer, a transparent substrate and a polarizing membrane, said optically anisotropic layer containing discotic compounds, said transparent substrate being optically anisotropic, and said polarizing membrane being arranged as an outermost layer of the liquid crystal display, wherein the optically anisotropic layer and the transparent substrate are so arranged that an angle between a normal discotic direction and a slow axis in a plane of the transparent substrate is essentially 45°, said normal discotic direction being an average of directions obtained by projecting normal lines of discotic planes of the discotic compounds on the plane of the transparent substrate, and wherein the transparent substrate and the polarizing membrane are so arranged that the slow axis in plane of the transparent substrate is essentially parallel to or essentially perpendicular to a transmission axis in plane of the polarizing membrane.

2. The liquid crystal display as defined in claim 1, wherein the transparent substrate has a Re retardation value defined by the formula (1) in the range of 5 to 100 nm and a Rth retardation value defined by the formula (2) in the range of 100 to 1,000 nm:

$$Re = (nx - ny) \times d \quad (1)$$

$$Rth = [(nx + ny)/2 - nz] \times d \quad (2)$$

in which nx is a refractive index of a slow axis in plane of the transparent substrate, ny is a refractive index of a fast axis in plane of the transparent substrate, nz is a refractive index of a thickness direction of the transparent substrate, and d is a thickness of the transparent substrate.

3. The liquid crystal display as defined in claim 1, wherein the ellipsoidal polarizing plate comprises an optically anisotropic layer, a transparent substrate and a polarizing membrane in this order.

4. The liquid crystal display as defined in claim 1, wherein the ellipsoidal polarizing plate comprises a lamination of two or more optically anisotropic transparent substrates, and at least one of the substrates, the optically anisotropic layer and the polarizing membrane are arranged as defined above.

5. The liquid crystal display as defined in claim 4, wherein one transparent substrate is a cellulose ester film, another transparent substrate is a polycarbonate film, and the ellipsoidal polarizing plate comprises an optically anisotropic layer, a cellulose ester film, a polycarbonate film and a polarizing membrane in this order.

6. The liquid crystal display as defined in claim 1, wherein the ellipsoidal polarizing plate comprises a lamination of two or more optically anisotropic transparent substrates, and each of the substrates, the optically anisotropic layer and the polarizing membrane are arranged as defined above.

7. The liquid crystal display as defined in claim 6, wherein one transparent substrate is a cellulose ester film, another transparent substrate is a polycarbonate film, and the ellipsoidal polarizing plate comprises an optically anisotropic layer, a cellulose ester film, a polycarbonate film and a polarizing membrane in this order.

8. The liquid crystal display as defined in claim 6, wherein the lamination of the transparent substrates has a Re retardation value defined by the formula (1) in the range of 5 to 100 nm and a Rth retardation valule defined by the formula (2) in the range of 100 to 1,000 nm:

$$Re = (nx-ny) \times d \quad (1)$$

$$Rth = [(nx+ny)/2 - nz] \times d \quad (2)$$

in which nx is a refractive index of a slow axis in plane of the lamination of the transparent substrates, ny is a refractive index of a fast axis in plane of the lamination of the transparent substrates, nz is a refractive index of a thickness direction of the lamination of the transparent substrates, and d is a thickness of the lamination of the transparent substrates.

9. The liquid crystal display as defined in claim 8, wherein the ellipsoidal polarizing plate comprises an optically anisotropic layer, a lamination of transparent substrates and a polarizing membrane in this order, and the transparent substrate facing the polarizing membrane and the polarizing membrane are so arranged that a slow axis in plane of the transparent substrate is essentially parallel to a transmission axis in plane of the polarizing membrane.

10. The liquid crystal display as defined in claim 1, wherein each of the polarizing elements is an ellipsoidal polarizing plate comprising a lamination of an optically anisotropic layer, a transparent substrate and a polarizing membrane, said optically anisotropic layer contamning discotic compounds, said transparent substrate being optically anisotropic, and wherein the transparent substrate, the optically anisotropic layer and the polarizing membrane are arranged as defined above in each of the ellipsoidal polarizing plates.

11. A liquid crystal display comprising a liquid crystal cell of a homogeneous alignment mode and two polarizing elements respectively arranged on each side of the liquid crystal cell, at least one of said polarizing elements being an ellipsoidal polarizing plate comprising a lamination of an optically anisotropic layer, a transparent substrate and a polarizing membrane, said optically anisotropic layer containing discotic compounds, said transparent substrate being optically anisotropic, and said polarizing membrane being arranged as an outermost layer of the liquid crystal display, wherein the optically anisotropic layer and the transparent substrate are so arranged that an angle between a normal discotic direction and a slow axis in a plane of the transparent substrate is essentially 45°, said normal discotic direction being an average of directions obtained by projecting normal lines of discotic planes of the discotic compounds on the plane of the transparent substrate, and wherein the transparent substrate and the polarizing membrane are so arranged that the slow axis in plane of the transparent substrate is essentially parallel to or essentially perpendicular to a transmission axis in plane of the polarizing membrane.

12. The liquid crystal display as defined in claim 11, wherein the transparent substrate has a Re retardation value defined by the formula (1) in the range of 0 to 100 nm and a Rth retardation value defined by the formula (2) in the range of 10 to 1,000 nm:

$$Re = (nx-ny) \times d \quad (1)$$

$$Rth = [(nx+ny)/2 - nz] \times d \quad (2)$$

in which nx is a refractive index of a slow axis in plane of the transparent substrate, ny is a refractive index of a fast axis in plane of the transparent substrate, nz is a refractive index of a thickness direction of the transparent substrate, and d is a thickness of the transparent substrate.

13. The liquid crystal display as defined in claim 11, wherein the ellipsoidal polarizing plate comprises an optically anisotropic layer, a transparent substrate and a polarizing membrane in this order.

14. The liquid crystal display as defined in claim 11, wherein each of the polarizing elements is an ellipsoidal polarizing plate comprising a lamination of an optically anisotropic layer, a transparent substrate and a polarizing membrane, said optically anisotropic layer containing discotic compounds, said transparent substrate being optically anisotropic, and wherein the transparent substrate, the optically anisotropic layer and the polarizing membrane are arranged as defined above in each of the ellipsoidal polarizing plates.

15. An ellipsoidal polarizing plate comprising a lamination of an optically anisotropic layer, a transparent substrate and a polarizing membrane, said optically anisotropic layer containing discotic compounds, said transparent substrate being optically anisotropic, and said polarizing membrane being arranged as an outermost layer, wherein the optically anisotropic layer and the transparent substrate are so arranged that an angle between a normal discotic direction and a slow axis in plane of the transparent substrate is essentially 45°, said normal discotic direction being an average of directions obtained by projecting normal lines of discotic planes of the discotic compounds on plate of the substrate, and wherein the transparent substrate and the polarizing membrane are so arranged that a slow axis in plane of the transparent substrate is essentially parallel to or essentially perpendicular to a transmission axis in plane of the polarizing membrane.

16. The ellipsoidal polarizing plate as defined in claim 15, wherein the transparent substrate has a Re retardation value defined by the formula (1) in the range of 0 to 100 nm and a Rth retardation value defined by the formula (2) in the range of 10 to 1,000 nm:

$$Re=(nx-ny) \times d \quad (1)$$

$$Rth=[(nx+ny)/2-nz] \times d \quad (2)$$

in which nx is a refractive index of a slow axis in plane of the transparent substrate, ny is a refractive index of a fast axis in plane of the transparent substrate, nz is a refractive index of a thickness direction of the transparent substrate, and d is a thickness of the transparent substrate.

17. The ellipsoidal polarizing plate as defined in claim 16, wherein the ellipsoidal polarizing plate comprises a lamination of two or more optically anisotropic transparent substrates, and each of the substrates, the optically anisotropic layer and the polarizing membrane are arranged as defined above.

18. The ellipsoidal polarizing plate as defined in claim 17, wherein one transparent substrate is a cellulose ester film, another transparent substrate is a polycarbonate film, and the ellipsoidal polarizing plate comprises an optically anisotropic layer, a cellulose ester film, a polycarbonate film and a polarizing membrane in this order.

19. The ellipsoidal polarizing plate as defined in claim 17, wherein the lamination of the transparent substrates has a Re retardation value defined by the formula (1) in the range of 5 to 100 nm and a Rth retardation value defined by the formula (2) in the range of 100 to 1,000 nm:

$$Re=(nx-ny) \times d \quad (1)$$

$$Rth=[(nx+ny)/2-nz] \times d \quad (2)$$

in which nx is a refractive index of a slow axis in plane of the lamination of the transparent substrates, ny is a refractive index of a fast axis in plane of the lamination of the transparent substrates, nz is a refractive index of a thickness direction of the lamination of the transparent substrates, and d is a thickness of the lamination of the transparent substrates.

20. The ellipsoidal polarizing plate as defined in claim 19, wherein the ellipsoidal polarizing plate comprises an optically anisotropic layer, a lamination of transparent substrates and a polarizing membrane in this order, and the transparent substrate facing the polarizing membrane and the polarizing membrane are so arranged that a slow axis in plane of the transparent substrate is essentially parallel to a transmission axis in plane of the polarizing membrane.

21. The ellipsoidal polarizing plate as defined in claim 15, wherein the ellipsoidal polarizing plate comprises an optically anisotropic layer, a transparent substrate and a polarizing membrane in this order.

22. The ellipsoidal polarizing plate as defined in claim 15, wherein the ellipsoidal polarizing plate comprises a lamination of two or more optically anisotropic transparent substrates, and at least one of the substrates, the optically anisotropic layer and the polarizing membrane are arranged as defined above.

23. The ellipsoidal polarizing plate as defined in claim 22, wherein one transparent substrate is a cellulose ester film, another transparent substrate is a polycarbonate film, and the ellipsoidal polarizing plate comprises an optically anisotropic layer, a cellulose ester film, a polycarbonate film and a polarizing membrane in this order.

* * * * *